US011808548B1

(12) United States Patent
McIntosh et al.

(10) Patent No.: US 11,808,548 B1
(45) Date of Patent: *Nov. 7, 2023

(54) CAMOUFLAGE PATTERNS

(71) Applicant: U.S. Government as Represented by the Secretary of the Army, Natick, MA (US)

(72) Inventors: Scotlund McIntosh, Framingham, MA (US); Lisa Bareiss Hepfinger, Holliston, MA (US); Cheryl Ann Stewardson, Hopedale, MA (US); Anabela Dugas, Rochester, MA (US); James George Fairneny, Roslindale, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/678,071

(22) Filed: Feb. 23, 2022

Related U.S. Application Data

(63) Continuation of application No. 17/099,888, filed on Nov. 17, 2020, now Pat. No. 11,293,723, which is a
(Continued)

(51) Int. Cl.
| | |
|---|---|
| *F41H 3/02* | (2006.01) |
| *F41H 3/00* | (2006.01) |
| *B32B 5/00* | (2006.01) |
| *A41D 31/02* | (2019.01) |
| *A41D 29/00* | (2006.01) |

(Continued)

(52) U.S. Cl.
CPC .............. *F41H 3/02* (2013.01); *A41D 29/00* (2013.01); *A41D 31/02* (2013.01); *A41D 13/00* (2013.01); *A41D 2600/108* (2013.01); *A41D 2600/20* (2013.01); *B32B 5/00* (2013.01);
(Continued)

(58) Field of Classification Search
None
See application file for complete search history.

(56) References Cited

U.S. PATENT DOCUMENTS

| | | | |
|---|---|---|---|
| 5,972,479 | A | 10/1999 | Lehman et al. |
| 6,061,828 | A | 5/2000 | Josephs |

(Continued)

OTHER PUBLICATIONS

Alvin O Ramsley, "Camouflage Patterns-Effects of Size and Color", Jul. 1979, Defense Technical Information Center (DTIC).
(Continued)

*Primary Examiner* — Laura C Powers
(74) *Attorney, Agent, or Firm* — Roger C. Phillips; Emily C. Moscati

(57) ABSTRACT

Camouflage patterns on a substrate such as a fabric comprise in a first aspect a substrate having a camouflage pattern with a set of intermixed colored blotches thereon, the colors of the set of intermixed colored blotches being selected from a group of colors comprising an Olive 527 color, a Dark Green 528 color, a Tan 525 color, a Brown 529 color, a Bark Brown 561 color and a Dark Cream 559 color. In another aspect the colors of the set of intermixed colored blotches being selected from a group of colors comprising an Olive 527 color, a Dark Green 528 color, a Light Sage 560 color, a Tan 525 color, a Brown 529 color, a Bark Brown 561 color and a Dark Cream 559 color.

20 Claims, 42 Drawing Sheets
(19 of 42 Drawing Sheet(s) Filed in Color)

Related U.S. Application Data continuation of application No. 16/211,404, filed on Dec. 6, 2018, now Pat. No. 10,900,750, and a continuation of application No. 15/456,953, filed on Mar. 13, 2017, now Pat. No. 10,197,362, application No. 17/678,071 is a continuation of application No. 14/721,388, filed on May 26, 2015, now Pat. No. 9,631,900, and a continuation of application No. 14/569,317, filed on Dec. 12, 2014, now Pat. No. 9,062,938.

(51) Int. Cl.
 D03D 1/00 (2006.01)
 A41D 13/00 (2006.01)

(52) U.S. Cl.
 CPC .............. D03D 1/00 (2013.01); F41H 3/00 (2013.01); Y10S 2/90 (2013.01); Y10S 428/919 (2013.01)

(56) References Cited

U.S. PATENT DOCUMENTS

| | | |
|---|---|---|
| D464,790 S | 10/2002 | Townes et al. |
| D487,848 S | 3/2004 | Crye et al. |
| D491,372 S | 6/2004 | Dugas et al. |
| 6,805,957 B1 | 10/2004 | Santos et al. |
| 6,933,023 B2 | 8/2005 | Clausen et al. |
| D560,915 S | 2/2008 | Crye et al. |
| D572,909 S | 7/2008 | Crye et al. |
| D592,861 S | 5/2009 | Crye et al. |
| 8,528,120 B2 | 9/2013 | Underwood et al. |
| 2010/0330348 A1 | 12/2010 | Lenz |

OTHER PUBLICATIONS

Alvin O Ramsley and Walter G. Yeomans, Jr., "Psychophysics of Modern Camouflage", Jun. 1982, Defense Technical Information Center (DTIC).

US Army Natick Soldier Research Development and Engineering Center (NSRDEC); Woodland BDU Camouflage Pattern; Jan. 1981.

Alvin O Ramsley and William B. Bushnell, "Development of the Woodland Battle Dress Uniform", Jan. 1981, Defense Technical Information Center (DTIC).

U.S. Patent Application Entitled "Camouflage for Garment Assembly", U.S. Appl. No. 14/569,158, filed Dec. 12, 2014.

"Photosimulation Camouflage Detection Test", US Army Natick Soldier Research Development and Engineering Center (NSRDEC), Jun. 2009.

US Army Natick Soldier Research Development and Engineering Center (NSRDEC); W20601 Prototype Camouflage Pattern; May 2011.

U.S. Patent Application Entitled "Camouflage for Garment Assembly", U.S. Appl. No. 14/717,270, filed May 20, 2015.

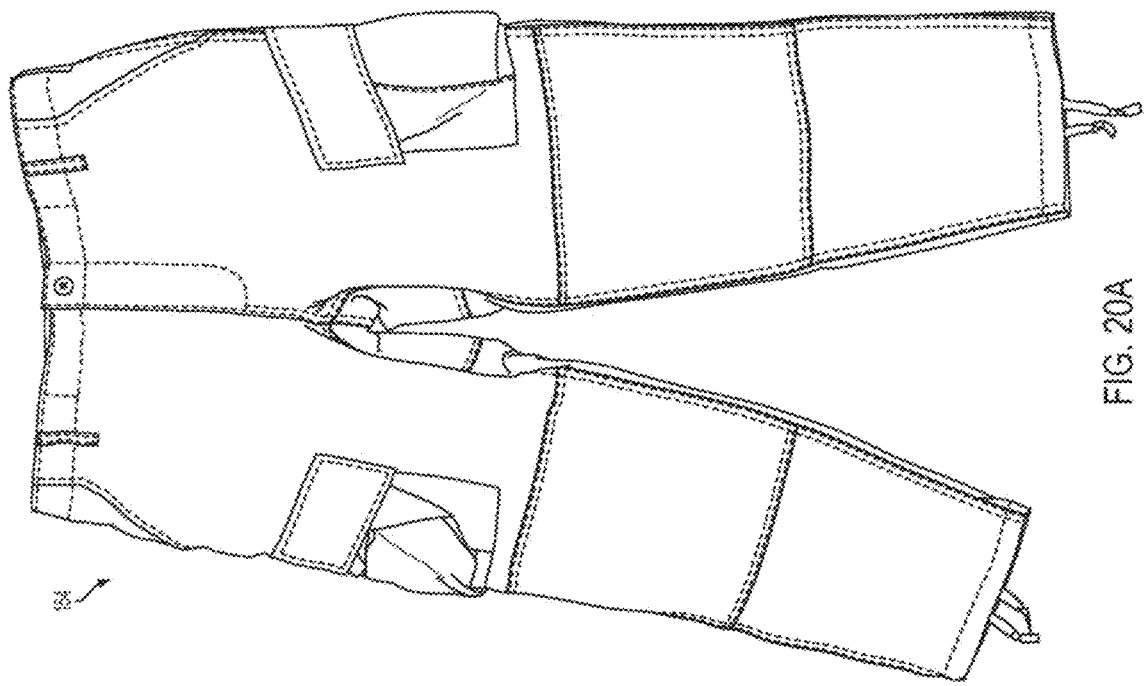

CAMOUFLAGE PATTERNS

CROSS-REFERENCE TO RELATED APPLICATIONS

This application is a continuation of U.S. patent application Ser. No. 16/211,404, entitled "CAMOUFLAGE PATTERNS", filed 6 Dec. 2018 which is a continuation of U.S. patent application Ser. No. 15/456,953, entitled "CAMOUFLAGE PATTERNS", filed 13 Mar. 2017 which is a continuation of U.S. patent application Ser. No. 14/721,388, entitled "CAMOUFLAGE PATTERNS", filed 26 May 2015 which, in turn, is a continuation of U.S. patent application Ser. No. 14/569,317, entitled "CAMOUFLAGE PATTERNS", filed Dec. 12, 2014 the entire contents of each of which are hereby incorporated herein.

STATEMENT OF GOVERNMENT INTEREST

The invention described herein may be manufactured and used by or for the U.S. Government for governmental purposes without the payment of any royalties thereon or therefor.

FIELD

The aspects of the present disclosure relate generally to the field of camouflage, and in particular, a camouflage pattern and articles and objects with a camouflage pattern applied thereto.

BACKGROUND

Concealment through camouflage is used extensively by the military to reduce enemy perception of military installations, units, equipment and personnel, with the objective to enhance mission success, provide tactical advantage and survival. The general purpose of camouflage is to disrupt the perceived image of a target object, whether the target object is a person, vehicle, building or other object. A goal of effective camouflage is to make the target object unrecognizable or indistinguishable from the environment in which it is in.

The importance of camouflage can vary based on the terrain and mission. In military applications for example, the camouflage objectives are generally to minimize visual perception of soldiers in daylight and detection by image intensifier devices in reduced or non-daylight environments. While camouflage is very often discussed and employed with respect to military applications, other outdoor activities can also make use of camouflage patterns, including for example, hunting and wildlife observation.

To be effective, camouflage must be capable of being seen by an observer. In military applications, the objective is to make the soldier appear to be an organic part of the scene in a manner that will not cue an observer's eye. The term "cue" as is used herein, is generally intended to mean to draw attention or focus. Disruptive camouflage or disruptive patterning is a form of camouflage that works by breaking up the outlines of the object using a strongly contrasting pattern that is applied to the object. In such disruptive patterning, the disruption of the outline(s) of the object depends on the high contrast of the camouflage pattern.

A camouflage pattern will typically include one or more blotches of color. The term "blotch" or "blotches" as is used herein, generally refers to varying regular shapes (e.g., but not limited to circles, ovals, ellipses) and irregular shapes all of varying sizes, dimensions, appearance, contrast and color.

Generally, the blotches of color in the camouflage have to be conspicuous. If the level of breakup of a camouflage pattern for a particular background or conflict distance is insufficient, the soldier will not blend with the scene. If the soldier does not blend in with the scene, the soldier can be detected or cued in on from a further range. It would be advantageous to provide a camouflage pattern where the observer will perceive more break-up of the camouflage pattern over longer distances.

An effective camouflage pattern is a first line of defense against an opposing force. Not being detected will increase survivability. It would be advantageous to provide a camouflage pattern that offers improved concealment and will enhance force protection and survivability for soldiers.

There have been many approaches trying to address camouflage patterns. The most common appearance of military camouflage are various forms of curving shapes in the camouflage pattern that appear in three to four natural "earth tone" colors. One example of such an approach is the "woodland" pattern, used by the U.S. Army beginning in 1981 for its Battle Dress Uniform. A four color pattern chosen for this design included the colors Light Green, Dark Green, Brown and Black. In an article written by Alvin O. Ramsley entitled "Psychophysics of Modern Camouflage" (U.S. Army Natick Research and Development Laboratories, 1982), the disclosure of which is incorporated herein by reference, the performance and advantages of this four color pattern over the older pattern that it replaced are discussed. In certain environments, this four color pattern provided the advantage of a disruptive pattern at longer ranges than previously realized. However, the Woodland pattern may not perform well across the range of environments and terrains in which the military currently operates.

Based on efforts conducted in coordination with the US Army Corps of Engineers Cold Regions Research and Engineering Center (CRREL), the Global Land Cover 2000 (GLC2000) product developed by the U.N. Food and Agriculture Organization may be used in determining land cover classes and further used as a means to describe terrain types with military relevance. These classes have been categorized into arid, woodland and transitional.

In using the GLC2000 classifications, vegetation types generally consist of trees, shrubs and cropland/herbaceous (grasses). The types of terrain areas and background can generally be defined in terms of crown cover—the percentage of ground that is covered by plant perimeters (e.g. trees, shrubs, or grass). Arid areas can be classified either as "bare areas" along with a color for the predominant sand/soil in the environment ("bare areas—dark" for example) or "sparse herbaceous/sparse shrub cover" (SHSSC). A deciding factor between the arid, transitional and woodland areas can be based on the amount of crown cover that is present in the scene. In order for a SHSSC area to be considered arid, the area would need to have less than 20% crown cover (consisting of shrubs or grasses only, not trees), otherwise the area is classified as transitional. A woodland area is generally a closed crown situation (>60% crown cover) and the terrain is generally made up mostly of trees (height would be greater than 5 m). Transitional areas would be made up of any area dominated by shrubs, crops, mixed tree covers (containing both trees and shrubs), savannas or a combination thereof. The Army Woodland BDU was designed for a limited environment consisting of green leafy terrain with a heavy canopy. The Woodland BDU can be perceived to be too dark in terrains such as arid or transitional areas. This can reduce the effectiveness of the Army Woodland BDU in environments other than those for which it was originally designed.

For military applications, creating a camouflage out of a replica of a single specific background is inadequate. The military needs camouflage that will be applicable in many different environments and under different weather conditions with the minimum number of uniform sets. In addition, the military needs a camouflage pattern that works well in the visible spectrum, as well as in the near-infrared (NIR) and shortwave infrared (SWIR) range of the spectrum.

U.S. Design Pat. No. D487,848 to Crye et al. issued on 30 Mar. 2004 (the "'848 Patent"), is directed to a camouflage pattern applied to a substrate. The colors in the '848 Patent tend to be light and muted, causing them to be of low contrast relative to each other. Also, the blotch sizes of the camouflage pattern of the '848 Patent, such as, for example, the cream and dark brown blotches, are small in size and area. These factors can contribute to a pattern being perceived by an observer as merged together at distances that are shorter than desired.

The low contrast of the colors of the '848 Patent can be disadvantageous, as colors with low contrast will be perceived to merge together into a single color at shorter distances. It would be advantageous to provide a camouflage pattern that includes colors with a high contrast relative to each other and that will allow for a camouflage pattern to maintain an effective range over a greater distance before the colors in the pattern appear to the observer to merge into a single monotone color.

Smaller color differences between blotches in a camouflage pattern demonstrate low contrast. Larger differences in color between blotches demonstrate higher contrast. Color can be defined as dimensions of a stimulus expressed in terms of lightness (or value, going from white to grey to black), hue (e.g. red, green, blue, etc.) and saturation, or colorfulness. The term "saturation" as used herein generally refers to the amount of color in a given hue. It would be advantageous to provide a camouflage pattern where the colors are highly saturated and appear more vibrant, to increase the internal contrast and maintain an effective range over a longer distance.

In the '848 Patent, the blotch sizes of the camouflage design, such as, for example, the cream and dark brown blotches are small in size and area. This reduces the amount of the lightest and darkest colors in the overall pattern. However, the use of such smaller size pattern blotches will generally pose difficulties with the pattern blending in with larger clutter that may be apparent in the environment or scene. Smaller size blotches will also have a tendency to appear to an observer to merge into a monotone color at shorter ranges. It would be advantageous to provide a camouflage pattern where the sizes of the blotches in the camouflage pattern are enlarged to help give the pattern more perceived visual breakup over a longer distance. It would also be advantageous to increase the amount of area used in the pattern by, for example, the two colors that are of the highest contrast relative to each other to improve the effective range of the pattern before it is perceived to merge into a monotone color.

It is also noted that the gradients in the '848 Patent are generally subtle due to the low contrast between the colors and the design of the screens used to print the patterns. A gradient can be defined as an area of color that is not uniform, for example, it may be increasing or decreasing in the amount of colored ink applied along a particular direction. Contrast can be generally defined, in terms of camouflage patterns, as the level of difference in lightness, hue or saturation between two or more neighboring blotches of color. The subtle gradients of the '848 Patent together with the low contrast between colors will generally provide a shorter effective range of the pattern. It would be advantageous to provide an increased gradient to provide a more dramatic difference between the lightest and darkest areas of a camouflage pattern.

Due to the light and muted nature of the colors of the '848 Patent, a noticeable difference can be recognized when, for example, clothing or equipment with the pattern of the '848 Patent is mixed with clothing or equipment with patterns having darker colored patterns. As clothing and equipment patterns are printed darker, it would be advantageous to provide a camouflage pattern that will blend better with existing uniforms and equipment.

Uniforms with camouflage patterns imprinted thereon will have a tendency to fade over time as the uniforms are laundered. Wear studies that have been conducted demonstrate that military clothing fades with use and laundering. A lighter colored pattern, such as that of the '848 Patent, will tend to become even lighter, thus reducing the effective range of the pattern. It would be advantageous to provide a darker colored camouflage pattern that will maintain its effective range even after repeated use and laundering.

U.S. Design Pat. No. D592,861 to Crye et al., issued on 26 May 2009 (the "'861 Patent"), is directed to a substrate with a camouflage pattern. A pattern repeat of the camouflage design of the '861 Patent includes a combination of elongated vertically oriented lines or elements interspersed among blotches in a pattern repeat of the camouflage pattern. A pattern repeat, as that term is generally understood, includes a width and a length, also referred to as fill and warp. The "fill" or width of the pattern repeat is generally in the horizontal direction. The "warp" or length of the repeat is generally along the vertical direction. In this and many other patterns, the warp or length of the pattern repeat is less than the fill or width of the pattern repeat. The elongated vertically oriented lines or elements of the '861 Patent referred to above are disposed in the fill direction of the pattern repeat.

The distinctive vertically oriented line elements of the '861 Patent, also referred to as vertical twig and branch elements, are elongated and thin. Such elongated thin line elements will have a tendency to appear to merge together at shorter distances. The effectiveness of a camouflage pattern that includes elongated and thin vertically oriented line elements in transitional environments can be compromised due to signature cues in the vertical direction, meaning that the elongated thin vertical line elements in the camouflage pattern will stand out or be readily perceived. It would be advantageous to provide a camouflage pattern that lacks signature cues in the vertical direction and thus has improved performance over a wide range of terrains.

The camouflage design of the '861 Patent includes numerous light and dark brown areas. The number of these smaller blotches creates a dense pattern of such blotches in the camouflage design. These smaller blotches, together with the elongated vertically oriented lines or elements in the '861 Patent, results in a cluttered appearance in the pattern of the '861 Patent. Over a longer range, such a dense and cluttered pattern does not aid the wearer in preventing detection as much as a pattern with larger blotches in it. It would be advantageous to provide a camouflage pattern that does not result in a dense pattern of cluttered blotches to enhance detection prevention at longer distances.

Although there are numerous elements (by count) in the camouflage design of the '861 Patent, the percentage of area of a pattern repeat that is taken up by the two colors of greatest contrast in the pattern (dark brown and cream) is similar and the average size of the blotches in the pattern is not large, meaning that the blotches will not be seen as individual blotches over longer ranges. Rather, the blotches will be perceived to merge together. It would be advantageous to be able to increase the range over which individual colors of the camouflage pattern blotches are seen as individual blotches.

The camouflage pattern design of the '861 Patent does not include light and dark color gradient portions that are generally uniform across the entirety of the warp or fill direction in the brown layer of a single pattern repeat. Rather, the distribution of dark and light color regions of the camouflage pattern of the '861 Patent is random in direction, size and location for the dark and light portions of the pattern. This results in gradient differences in the camouflage pattern of the '861 Patent that might be referred to as "scattered." A disadvantage of such scattered gradient differences is that the pattern may not have any portion with larger sized blotches contrasting in color with other large or small blotches. This may result in a shorter effective range of the overall pattern.

U.S. Design Pat. No. D560,915 to Crye et al., issued 5 Feb. 2008, is directed to a camouflage pattern with a blocky or pixelated appearance. This camouflage pattern includes vertically oriented lines and elements interspersed on or within the camouflage pattern. The effectiveness of a pattern that includes vertical lines or elements can be compromised due to signature cues in the vertical direction.

U.S. Design Pat. No. D572,909 to Crye et al, issued 15 Jul. 2008, is directed to a camouflage pattern. The design of the camouflage pattern of the '909 Patent is very similar to that of the '915 Patent in that it is also blocky or pixilated in appearance. The main difference between the '915 Patent and the '909 Patent is that the overall pattern of the camouflage design of the '909 Patent is lighter in coloring than that of the '915 Patent. The general geometry of the shapes in the pattern, vertical stripes and gradients are substantially the same as that of the design of the '915 Patent. Changing the colors of the pattern of the '909 Patent to be lighter in shade from the pattern of the '915 Patent may only provide a slight increase in effectiveness when placed in arid-like terrains. However, the lighter colored pattern of the '909 Patent may have a tendency to be less effective in darker terrains.

Each of the '848, '861, '909 and '915 patents include seven separate color layers that combine together in printing and results in more than seven colors in the final pattern. Each color would be applied separately in the traditional rotary screen printing process, as described in more detail below.

In 2010, a prototype camouflage design developed by the US Army Natick Soldier Research Development and Engineering Center (NSRDEC) also included a seven (7) color pattern. This pattern, referred to as the "W20601" pattern, included the colors and color percentage scheme shown in Table I below. The color percentages represent the amount of the color in the pattern relative to the entire screen for one repeat of the pattern.

While suitable for its intended purposes, the W20601 pattern was found to suffer from the deficiency of sufficient brown coloration in the pattern to accommodate certain environments and terrains, such as arid and woodland dormant environments. This deficiency could limit the environments in which the W20601 pattern could be deployed as an effective camouflage pattern.

Accordingly, it would be desirable to provide a camouflage pattern that addresses at least some of the problems identified above.

Table I illustrates each of the percentages of the seven colors that are present in the W20601, the '861 and the '848 camouflage patterns which are discussed above.

TABLE I

| Color Percentages | | | |
|---|---|---|---|
| Color | W20601 | '848 Patent | '861 Patent |
| 1 | Olive 527 19.1% | Olive 21.4% | Olive 527 14.6% |
| 2 | Dark Green 528 12.6% | Dark Green 19.8% | Dark Green 528 8.2% |
| 3 | Pale Green 526 6.8% | Pale Green 5.8% | Pale Green 526 5.8% |
| 4 | Tan 525 1.8% | Tan 1.7% | Tan 525 2.2% |
| 5 | Brown 529 19.7% | Brown 15.3% | Brown 529 5.4% |
| 6 | Dark Brown 530 7.6% | Dark Brown 5.5% | Dark Brown 530 7.6% |
| 7 | Cream 524 6.6% | Cream 4.9% | Cream 524 6.8% |
| Combination of 1 & 2 | 16.3% | 6.5% | 19.7% |
| Combination of 3 & 4 & 5 | 9.7% | 19.0% | 29.7% |

The combinations illustrated in Table I above are representative of the combination of colors when the different color channels or layers are overlaid during printing. It will be understood that during a camouflage pattern printing process, such as a rotary screen printing process, for example, the different color layers of the camouflage pattern will be overlaid, one on top of another. The manner and timing in which one color layer is overlaid onto another color layer in rotary screen printing is generally understood in the art. Generally, the color dyes that are placed on the fabric dry at the same time as part of the process of rotary screen printing. This color layering process can result in the colors of the different color layers being combined during the printing process.

When a blotch of one color layer is similarly positioned relative to the location of a blotch of another color layer in a stack of color layers, there will be a combination of the colors of the respective color blotches on the different color layers. This combination, depending on the saturation and coverage of the respective colors, can result in a different color or a gradient that combines the two or three colors layers involved in different amounts.

Using the Adobe Photoshop™ computer graphics or photo editing program, the color percentage calculations in Table I above were determined using the following exemplary process:

Work with a Single RGB image to which layers can be added. If using a multichannel file, use "File"→"Open as Smart Object" first and save the resulting file to its own filename to avoid confusion.

Set the Magic Wand tool to "Tolerance: 10", "Anti-Alias: Off", "Contiguous: Off", and "Sample All Layers: Off". Use the magic wand tool to select a region of the pattern that exhibits 100% coverage of a single color. Starting with the Cream and the Dark Brown blotches, determine the pixel count using the histogram's uncached values for each of the independent colors.

If the region of interest with a gradient is composed of two colors that vary between 100% coverage and 0% coverage, select the entire geometry where those colors appear. Pressing the Shift key will allow the adding of geometry to the selection; pressing Alt will subtract it. Only select colors involved in the gradient.

The entire region that includes the gradient is selected and designated in a manner that demonstrates the selection area that is filled with the specified color. In the Adobe Photoshop™ program, "marching ants" are used, which is an animation technique often found in selection tools of computer graphics programs. The "marching ants" distinguish the selection border from the image background by animating the border with a dotted or dashed line. The dots or dashes will seem to walk slowly sideways and up and down.

A new layer is created based on the selected area. Using the paint bucket tool, this selected area is filled in with white on the new layer. This will cause the marching ants to outline the area of interest, avoiding the other colors. If an error is made, un-hide this layer, re-select the white area, and hide it again.

Uncheck the eye to hide the white and select the background layer. Set the Magic Wand Tool to 10% Tolerance and Alt+Click on one area from each of the colors that's fully covered. Doing this will unselect the areas in the geometry that are 100% covered by the colors involved in the gradient. Using the histogram, write down the number of uncached pixels that are selected by the marching ants. This number will represent the number of pixels that are in between the 100% covered colors.

Divide each of the uncached pixel counts for each of the colors by the sum of the counts to find the ratio that each color takes in the pattern.

While the above exemplary process is described as being carried out using the Adobe Photoshop™ program, it is noted that any suitable photo editor or computer graphics program can be used to determine the percentages of color in a camouflage pattern.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a camouflage pattern on a substrate comprising a substrate having a camouflage pattern with a set of intermixed colored blotches thereon, the colors of the set of intermixed colored blotches being selected from a group of colors comprising an Olive 527 color, a Dark Green 528 color, a Tan 525 color, a Brown 529 color, a Bark Brown 561 color and a Dark Cream 559 color. Wherein in a single repeat of the camouflage pattern about 18.4% to and including 21.5% of the set of the colored blotches consist of the Olive 527 color; about 12.9% to and including 15% of the set of the colored blotches consist of the Dark Green 528 color; about 2.4% to and including 2.8% of the set of the colored blotches consist of the Tan 525 color; about 28.7% to and including 33.5% of the set of the colored blotches consist of the Brown 529 color; about 6.9% to and including 8.1% of the set of the colored blotches consist of the Bark Brown 561 color; about 6.0% to and including 6.9% of the set of the colored blotches consist of the Dark Cream 559 color; about 8.8% to and including 9.8% of the set of the colored blotches consist of a combination of the Dark Green 528 color and Olive 527 color; and about 12.4% to and including 14.4% of the set of the colored blotches consist of a combination of the Brown 529 color and the Tan 525 color.

Another aspect of the exemplary embodiments relates to a camouflage pattern on a substrate comprising a substrate having a camouflage pattern with a set of intermixed colored blotches thereon. The colors of the set of intermixed colored blotches being selected from a group of colors comprising an Olive 527 color, a Dark Green 528 color, a Light Sage 560 color, a Tan 525 color, a Brown 529 color, a Bark Brown 561 color and a Dark Cream 559 color. Wherein in a single repeat of the camouflage pattern about 19.5% to and including 22.7% of the set of colored blotches consist of the Olive 527 color; about 12.9% to and including 15% of the set of the colored blotches consist of the Dark Green 528 color; about 10.9% to and including 12.7% of the set of the colored blotches consist of the Light Sage 560 color; about 2.3% to and including 2.6% of the set of the colored blotches consist of the Tan 525 color; about 11.1% to and including 13% of the set of the colored blotches consist of the Brown 529 color; about 6.9% to and including 8.1% of the set of the colored blotches consist of the Bark Brown 561 color; about 6.0% to and including 6.9% of the set of the colored blotches consist of the Dark Cream 559 color; about 8.1% to and including 9.5% of the set of the colored blotches consist of a combination of the Olive 527 color and the Dark Green 528 color; and about 12.4% to and including 14.4% of the set of the colored blotches consist of a combination of the Light Sage 560 color, the Tan 525 color and the Brown 529 color.

Further aspects involve the camouflage patterns described above on a fabric.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The file of this patent contains at least one drawing/photograph executed in color. Copies of this patent with color drawing(s)/photograph(s) will be provided by the Patent and Trademark Office upon request and payment of the necessary fee.

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

FIG. 20A is a front view of the trousers illustrated in FIG. 15.

DETAILED DESCRIPTION OF THE EXEMPLARY EMBODIMENTS OF THE DISCLOSURE

Figure 1:
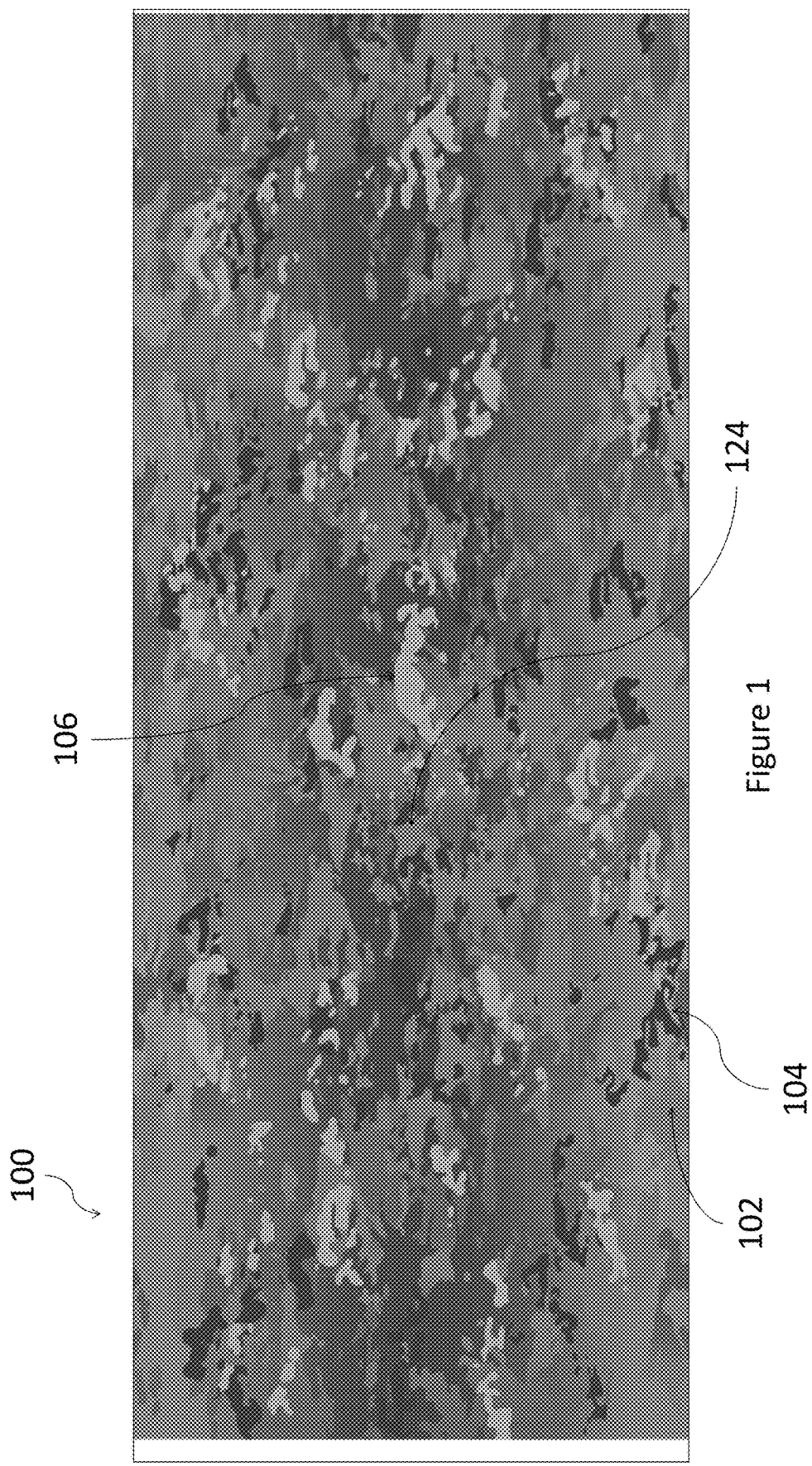
FIG. 1 illustrates one embodiment of a 7-color operational camouflage pattern incorporating aspects of the disclosed embodiments, in grayscale.

Referring to FIG. 1, one example of a seven (7)-color camouflage pattern 100 incorporating aspects of the disclosed embodiments is illustrated. The aspects of the disclosed embodiments are directed to a seven-color layer transitional camouflage pattern that represents a layering design effective to improve camouflage performance in the visual, near-infrared (NIR) and shortwave infrared regions (SWIR) of the electromagnetic spectrum. The unique camouflage pattern of the present disclosure can be applied to a substrate, such as a military garment or combat uniform, and is configured to provide improved concealment, which enhances force protection and survivability for soldiers.

While the aspects of the disclosed embodiments are generally described herein with respect to a military garment or uniform, the aspects of the disclosed embodiments are not so limited. Alternative applications of the camouflage pattern 100 can include, but are not limited to, helmets, helmet covers, hats, bags, back packs, netting, vehicles, aircraft, tracked vehicles including tanks, tents, portable enclosures and buildings, for example. Numerous other non-military applications for the camouflage pattern 100 of the disclosed embodiments can also be contemplated. These can include, for example, law enforcement, hunting, outdoor sports and other activities that can make use of the improved levels of concealment provided by the camouflage pattern 100 of the present disclosure.

The exemplary design of the camouflage pattern 100 illustrated in FIG. 1 generally comprises seven (7) color layers, a single layer being referred to as a layer 102. For the purposes of the disclosure herein, a layer 102 in the camouflage pattern 100 may also be referred to as a color channel. While the aspects of the disclosed embodiments are described herein with respect to a seven-color or layer camouflage pattern, it will be understood that the combination of the seven color layers can result in a pattern 100 that appears to have more than seven colors.

To provide the overall design of the camouflage pattern 100, the seven layers 102 are overlaid, one layer on top of another layer, in a camouflage printing process. A layer 102, or color channel, can have varying degrees of transparency. The design of the individual screens that make up a layer 102, and which are used to print the camouflage pattern 100, can allow some color channels to show through each other. This can allow for one or more gradients to appear in the overall design of the camouflage pattern 100.

As will be described further herein, in one embodiment, one color channel 102 of the camouflage pattern 100 is distinguishable from another color channel 102 of the camouflage pattern 100 by its color. A color channel 102 will have a specific color with a specific color distribution and will provide a distinct individual pattern.

As noted above, the W20601 pattern was found deficient in that insufficient brown coloration was present in the resulting pattern. In particular, it was determined that there was a need to increase the amount of brown coloration i?n the pattern to accommodate for environments and terrains such as the arid and woodland dormant environments. Relative to the W20601 pattern, the camouflage pattern 100 of the present disclosure increases the amount of brown appearing in the pattern 100, changes the overlay of the screens in the brown region, changes the physical size of the repeat of the pattern, increases the sizes of the blotches in certain color channels and changes the colors of certain color channels of the pattern. The increased overlay of the screens in the brown region provides for the aggregative effect of layers of dyes and pigments with spectral properties in the near and shortwave infrared. This will result in additional signature reduction. Additionally, the resulting increase in brown portions of the pattern advantageously reduces the percentage of the other colors in the pattern.

FIGS. 2-8 illustrate the different layers 102 or color channels of the camouflage pattern 100 of the present disclosure. As will be further described herein, the seven layers 102 of the camouflage pattern 100 comprise a brown color channel 200, a dark cream color channel 300, a bark brown color channel 400, a dark green color channel 500, an olive color channel 600, a light sage color channel 700 and a tan color channel 800. A more detailed description of each of the color channels 200-800 follows below. Each of the color names and numbers used herein refer to military colors in accordance with military specifications, such as for example MIL-DTL-44436B and its interim updates, both of which are hereby expressly incorporated herein by reference thereto.

As noted, the formation of the camouflage pattern 100 shown in FIG. 1 is a result of the combination of the seven color channels 200-800 during a camouflage printing process. In a camouflage printing process, such as in a rotary printing process, the seven color channels 200-800 are typically layered or superimposed, one layer over another layer. The respective color channels 200-800 are thus intermingled or combined. The camouflage pattern 100 is thus the result of the combination of the colors of the seven color channels 200-800.

During the process of printing the camouflage pattern 100 on a substrate, the color channels 200-800 are layered, one on top of another. The layering of color channels 200-800 in the camouflage pattern 100 allows for the use of various dye formulations that have improved effect for breakup in the near infrared (NIR) and shortwave infrared (SWIR) spectrums. In this way, the spectral response characteristics of the underlying color will affect the spectral response characteristics of the top color, as is known to one of ordinary skill of the art.

In the camouflage pattern 100, the dark cream color channel 300, the bark brown color channel 400 and the light sage color channel 700 of the camouflage pattern 100 are modified relative to the cream, brown and pale green colors, respectively, of the W20601 pattern. As will be described in more detail below, the colors of the camouflage pattern 100 of the disclosed embodiments are modified to be highly saturated and appear more vibrant to increase internal contrast. Internal contrast, in terms of camouflage patterns, is the level of difference in brightness or hue between two or more neighboring or adjacent blotches of color. As is generally understood, blotches and colors in a camouflage pattern will be perceived to merge together at certain distances or ranges. By increasing the contrast between different colors in the camouflage pattern 100 of the present disclosure, the camouflage pattern 100 can maintain an effective range over greater distances before the colors in the camouflage pattern 100 will appear, to an observer, to merge into a single monotone color.

As shown in FIG. 1, the camouflage pattern 100 comprises a plurality of blotches, generally shown as blotches 106. For purposes of the present invention, the definition of the term blotch or blotches 106 as used herein refers to varying irregular shapes and regular shapes (e.g., but not limited to, circles, ovals, ellipses) all of varying sizes, dimensions, appearance, contrast and color. When all seven layers 200-800 are superimposed, one over another to form the camouflage pattern 100, the entire surface of the camouflage pattern 100 is aggregately covered by the blotches 106 that result from the combination of the color channels 200-800. The camouflage pattern 100 has very few short thin line elements, and no long thin line elements such as the vertically oriented elongated thin line elements shown in the '861, '909 and '915 Patents.

Figure 2A:
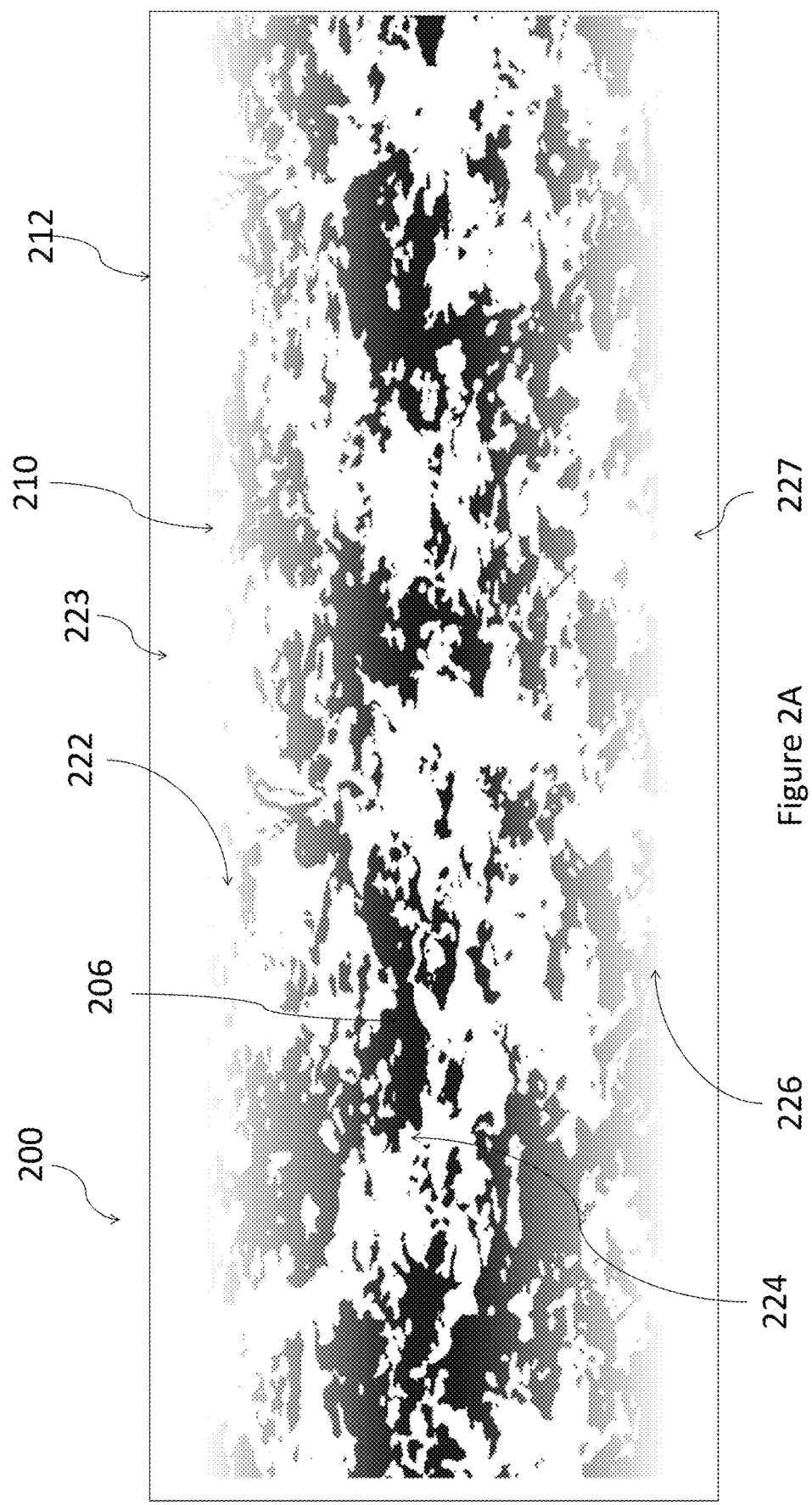
FIG. 2A illustrates one embodiment of a brown color channel for the camouflage pattern shown in FIG. 1.
Figure 2B:
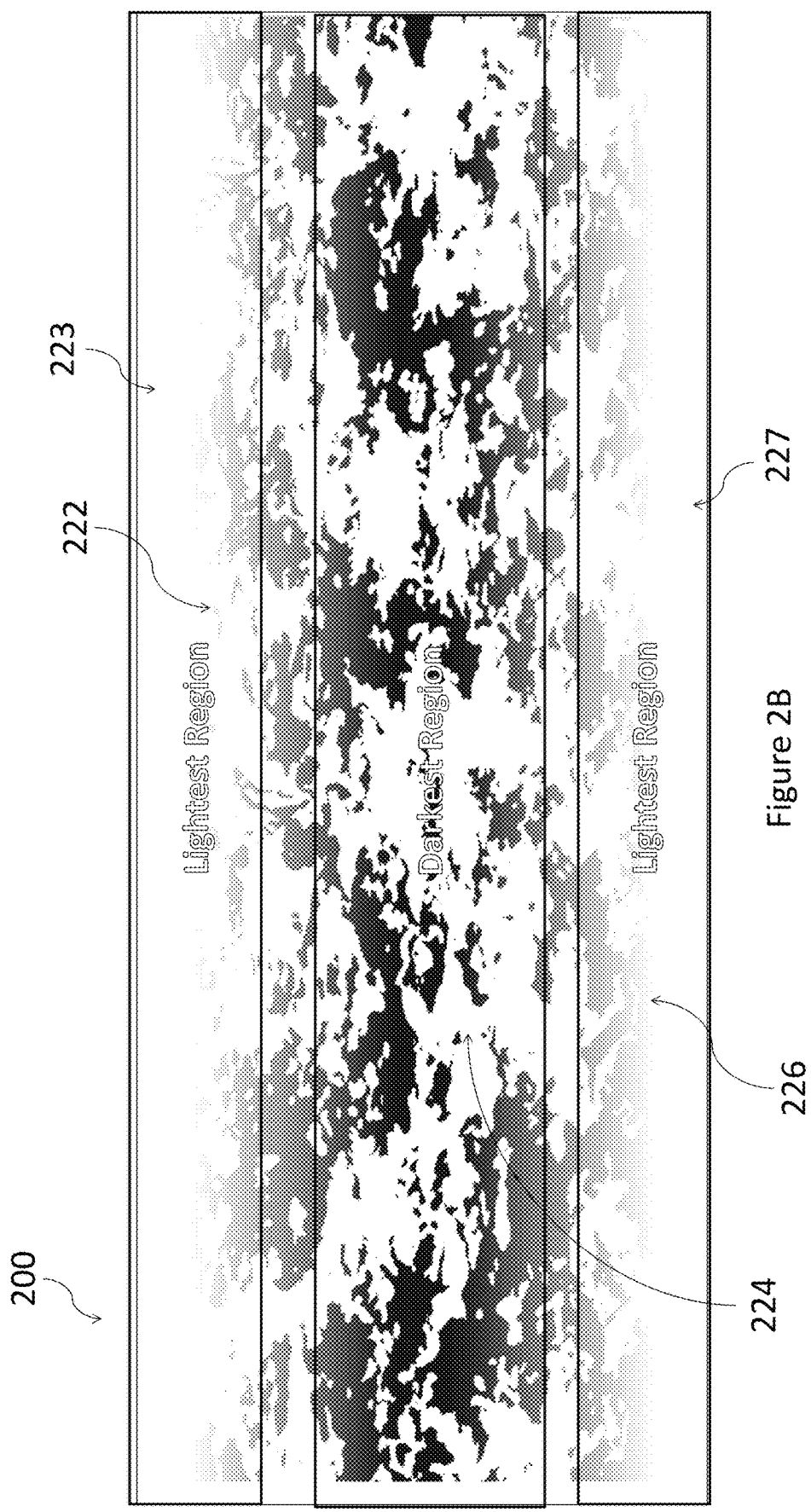
FIG. 2B illustrates the lighter and darker regions of the brown color channel shown in FIG. 2A.

FIG. 2A illustrates the brown color channel 200. The pattern repeat 212 of the brown layer 200 includes a plurality of discrete shapes or blotches 206. As shown in FIGS. 2A and 2B, the brown layer 200 also comprises three regions, generally identified as top region 222, central or middle region 224 and bottom region 226. The top region 222 and bottom region 226 are generally lighter in color than the middle or central region 224. For the purposes of the description herein, the top region 222 and bottom region 226 will be referred to as the "lightest regions" while the central region 204 will be referred to as the "darkest region."

The top region 222 includes region 223, while the bottom region includes region 227. Regions 223 and 227 are regions of the brown layer where there is little or no brown color printed. The lack of brown color in the regions 223, 227 will allow the light sage color of the light sage channel 700 to show through when the layers are combined.

The brown color channel 200 includes a gradient 210 that runs with the pattern repeat 212. Moving in the vertical or warp direction of FIG. 2B, the gradient 210 begins with the lighter or top region 222, followed by the central or dark region 224. Following the dark region 224, the gradient 210 reverts to a lighter region again in bottom region 226. This cycle repeats as the camouflage pattern 100 is printed on the substrate or fabric.

The gradient 210 is intensified in the vertical or warp direction, meaning that the color contrast changes along the vertical direction. In the horizontal or fill direction, the color contrast of the brown color channel 200 is substantially uniform across the width of the pattern repeat 212. The gradient 210 in the vertical direction is an element in the formation of the brown color of the camouflage pattern 100 shown in FIG. 1.

The top region 222 of the pattern repeat 212 is an area where very little brown is printed onto the substrate or fabric. The middle region 224 of the pattern repeat 212 has considerably more brown color being printed. The brown color channel 200 is mostly on top of the other color channels 300-800 of the pattern 100 as a result of the printing process. This combination of the color channel 200 with the other color channels 300-800 results in the camouflage pattern 100 appearing darker to an observer, and provides improved effectiveness in transitional environments.

Figure 3:
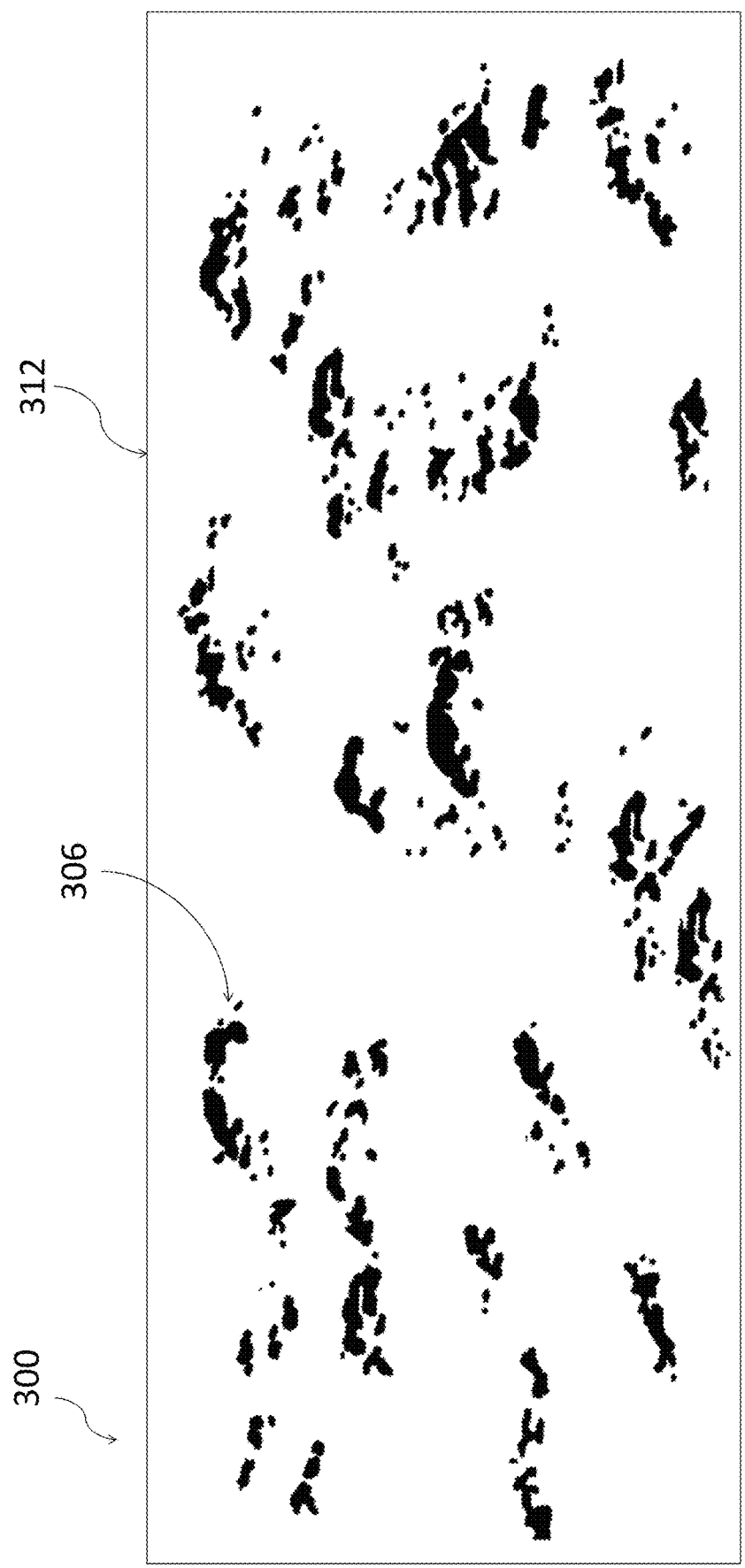
FIG. 3 illustrates one embodiment of a dark cream color channel for the camouflage pattern of the present disclosure.

FIG. 3 illustrates the dark cream color channel 300. In this example, pattern repeat 312 of the dark cream channel 300 includes blotches 306. The relative size of the dark cream color blotches 306 is generally larger than those of the '848 Patent, '861 Patent, '909 Patent and the '915 Patent.

The larger sizes and areas of the blotches 306 will increase the effective range of the camouflage pattern 100 of FIG. 1 by increasing the range over which the observer will be able to discern a difference between the blotches 306. As range to target distance increases, a pattern will be perceived to merge to a monotone color based on a number of factors. This range to target distance can be referred to as "merge range." Some of these factors related to the merge range of a pattern are described in a paper authored by Alvin O. Ramsley entitled "Camouflage Patterns—Effects of Size & Color", (U.S. Army Natick Research and Development Command, 1979), the disclosure of which is incorporated herein by reference in its entirety. The merge range is generally determined by the size and contrast of the blotches 306. The larger sizes and areas of the blotches 306 will contribute to the pattern 100 maintaining its internal contrast over a longer range than a pattern with smaller blotch sizes, which will improve camouflage performance.

Figure 4:
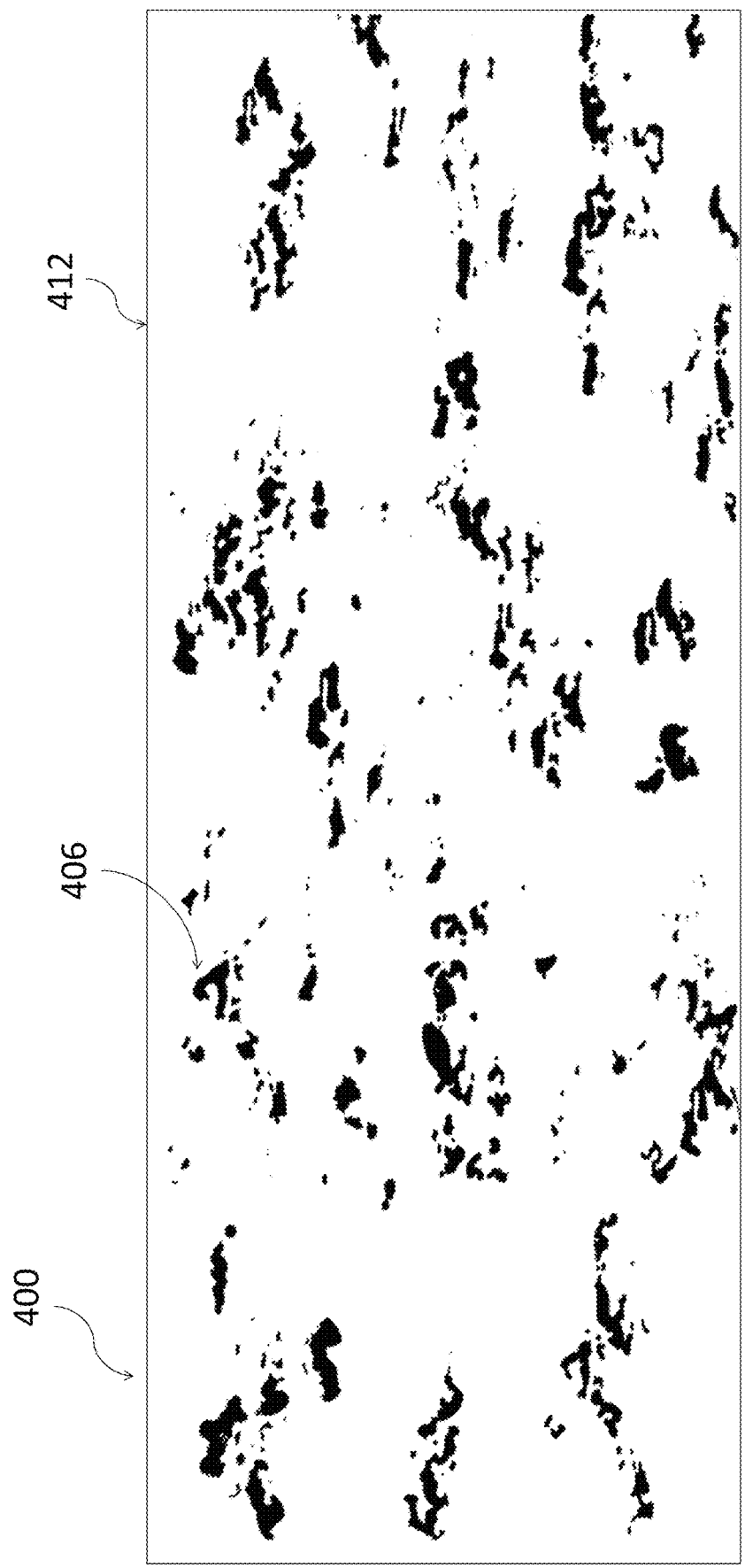
FIG. 4 illustrates one embodiment of a bark brown color channel for the camouflage pattern of the present disclosure.

FIG. 4 illustrates the bark brown color channel 400. In this example, the pattern repeat 412 of the bark brown channel 400 includes a plurality of discrete shapes or blotches 406. The relative size of the bark brown color blotches 406 is also, as with the dark cream color blotches 306, generally larger than those in the '848 Patent, '861 Patent, '909 Patent and the '915 Patent.

The larger sizes and areas of the blotches 406 will increase the effective range of the camouflage pattern 100 of FIG. 1 by increasing the range over which the observer will be able to discern a difference between the blotches. As noted above, as the range to target increases, a pattern will merge to a monotone color based on a number of known perceptual factors. This merge range is determined by the size and contrast of the blotches. The larger blotches 406 will contribute to the pattern maintaining its internal contrast over a longer range than a pattern with smaller element sizes, providing for improved camouflage performance. The increase in size of the dark cream blotches 306 and the bark brown blotches 406 is not only advantageous in the visual spectrum as noted, but also improves NIR and SWIR performance. The NIR and SWIR performance will be improved by contrast of the colors when viewed through infrared imagers. It will be appreciated that the relative blotch size of the dark cream color blotches 306 of FIG. 3 and the bark brown color blotches 406 of FIG. 4 are generally smaller than those of the dark brown and cream color blotches in W20601, although, that is offset by the increased color contrast compared to W20601. The smaller blotch size is offset by a higher color contrast and a different set of seven colors.

The enlargement of the size of the dark cream blotches 306 and bark brown blotches 406 in the respective color channels 300, 400, allows the camouflage pattern 100 to blend in better with larger clutter that may be apparent in a scene. The dark cream color of the dark cream color channel 300 and the bark brown color of the bark brown color channel 400 have the highest separation in color contrast relative to each other and is greater than that of the cream and the dark brown colors of W20601. Increasing the amount of area used in the camouflage pattern 100 by the two colors that are of highest color contrast to each other, dark cream and dark brown, advantageously improves the effective range of the camouflage pattern 100.

Figure 5A:
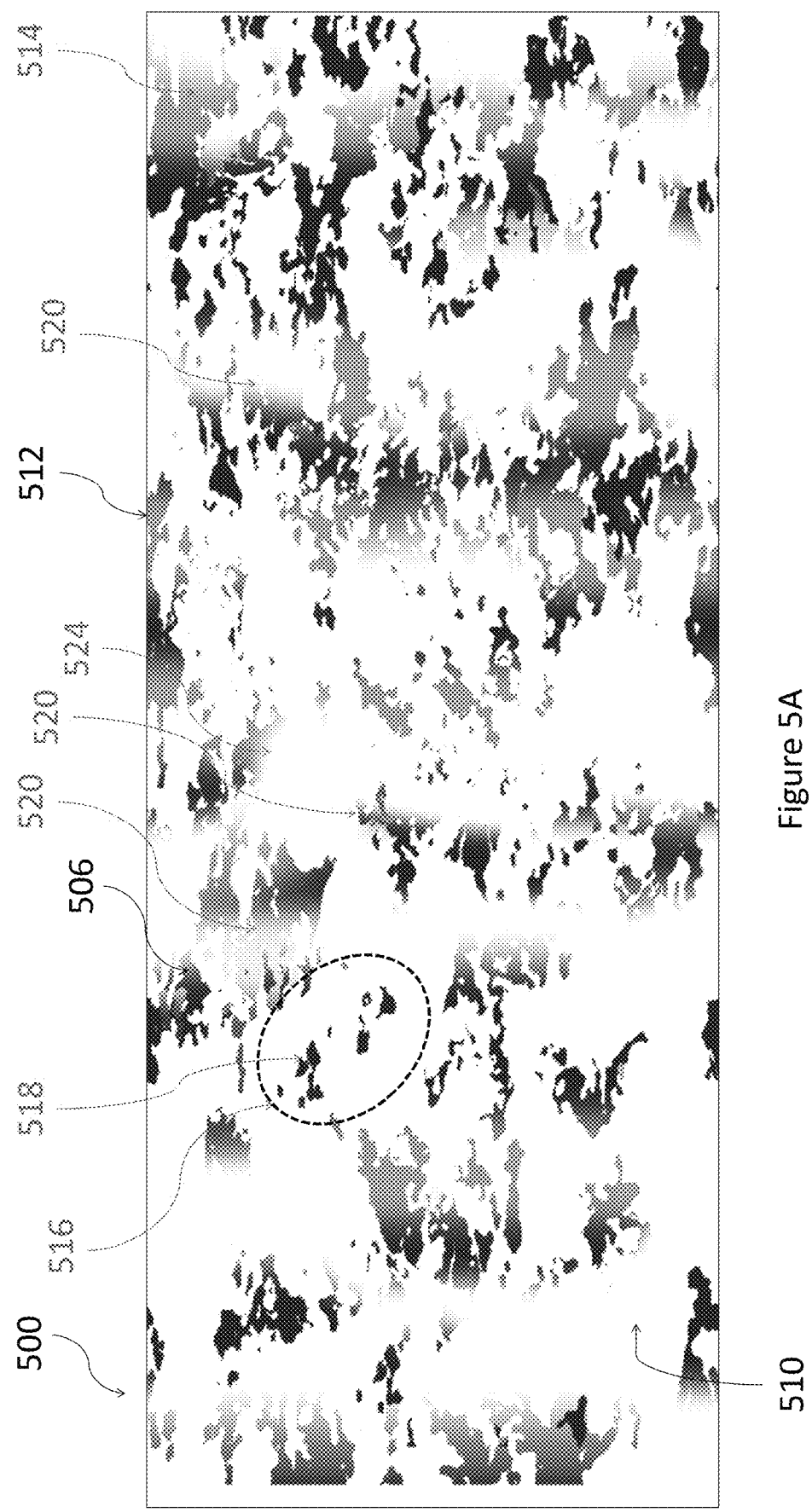
FIG. 5A illustrates one embodiment of a dark green color channel for the camouflage pattern shown of the present disclosure.

FIG. 5A illustrates the dark green color channel 500. In this example, the pattern repeat 512 of the dark green channel 500 includes blotches 506. The pattern repeat 512 also includes blotches 518, such as those shown within region 516, which are solid areas of color coverage. Blotches 518 offer a contrast to adjacent blotches 506 which are subject to less than 100% color coverage and increase the overall performance range of the pattern repeat 512.

Figure 5B:
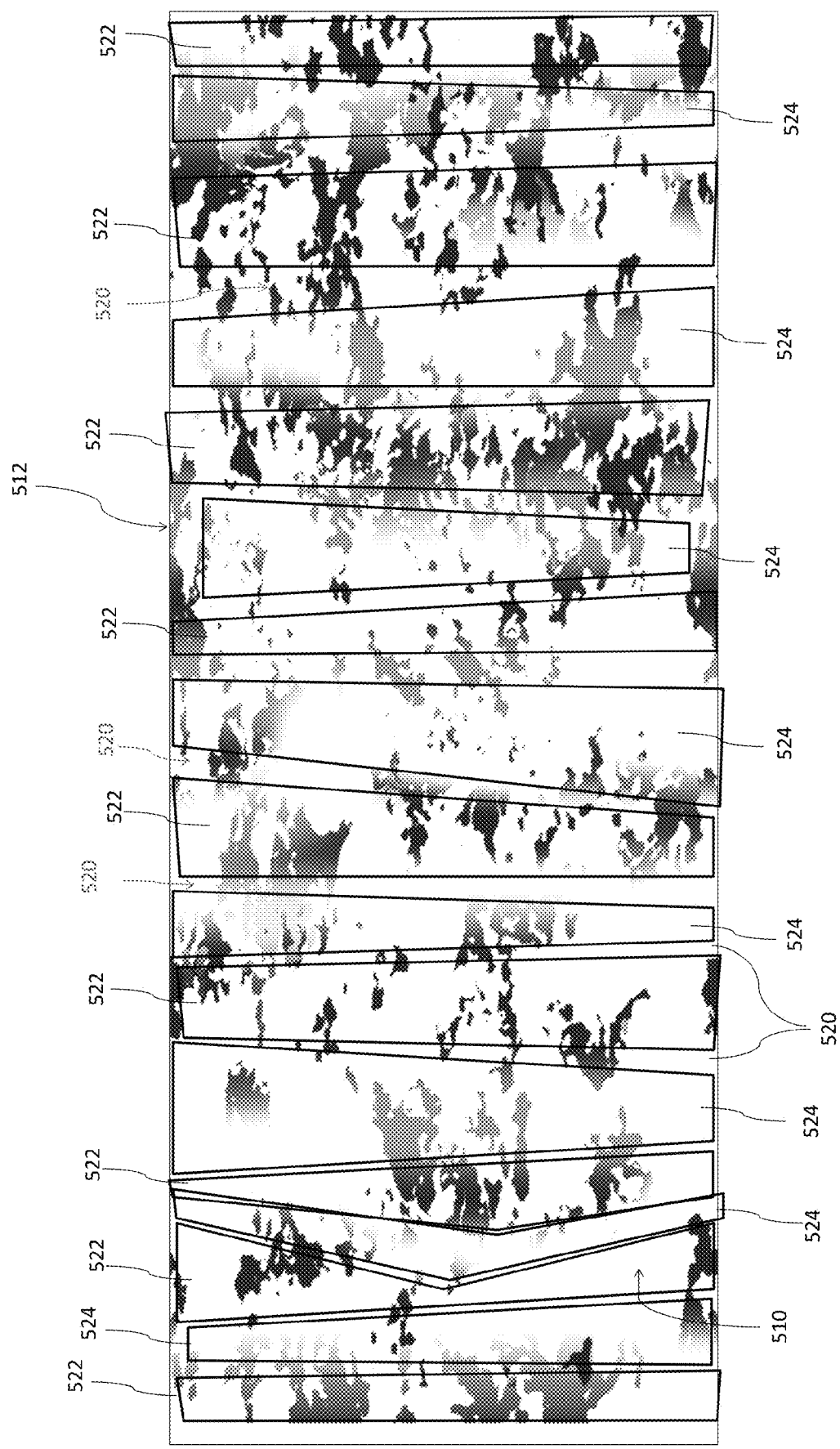
FIG. 5B illustrates the lighter and darker regions of the dark green color channel shown in FIG. 5A.

The pattern repeat 512 of the dark green color channel 500 includes one or more vertically oriented striated gradients 510 that run substantially horizontally across the pattern 512. Referring to FIG. 5B, moving from left to right across the pattern repeat 512, the gradients 510 of the dark green color channel 500 will generally alternate between darker areas 522 and lighter areas 524, and variations of darker and lighter areas there between. This variation of darker and lighter areas in the example of FIGS. 5A and 5B is advantageous because it provides a random breakup in the design of the camouflage pattern 100 shown in FIG. 1. The variation or random breakup in the camouflage pattern 100 improves the ability of a substrate bearing the design of the camouflage pattern 100 to blend in with the background of the environment in which the camouflage pattern 100 is being used. The gradients 510 extend horizontally along the pattern repeat 512 and run through each pattern repeat 512. The cycle repeats as the pattern repeat 512 is printed.

Figure 6:
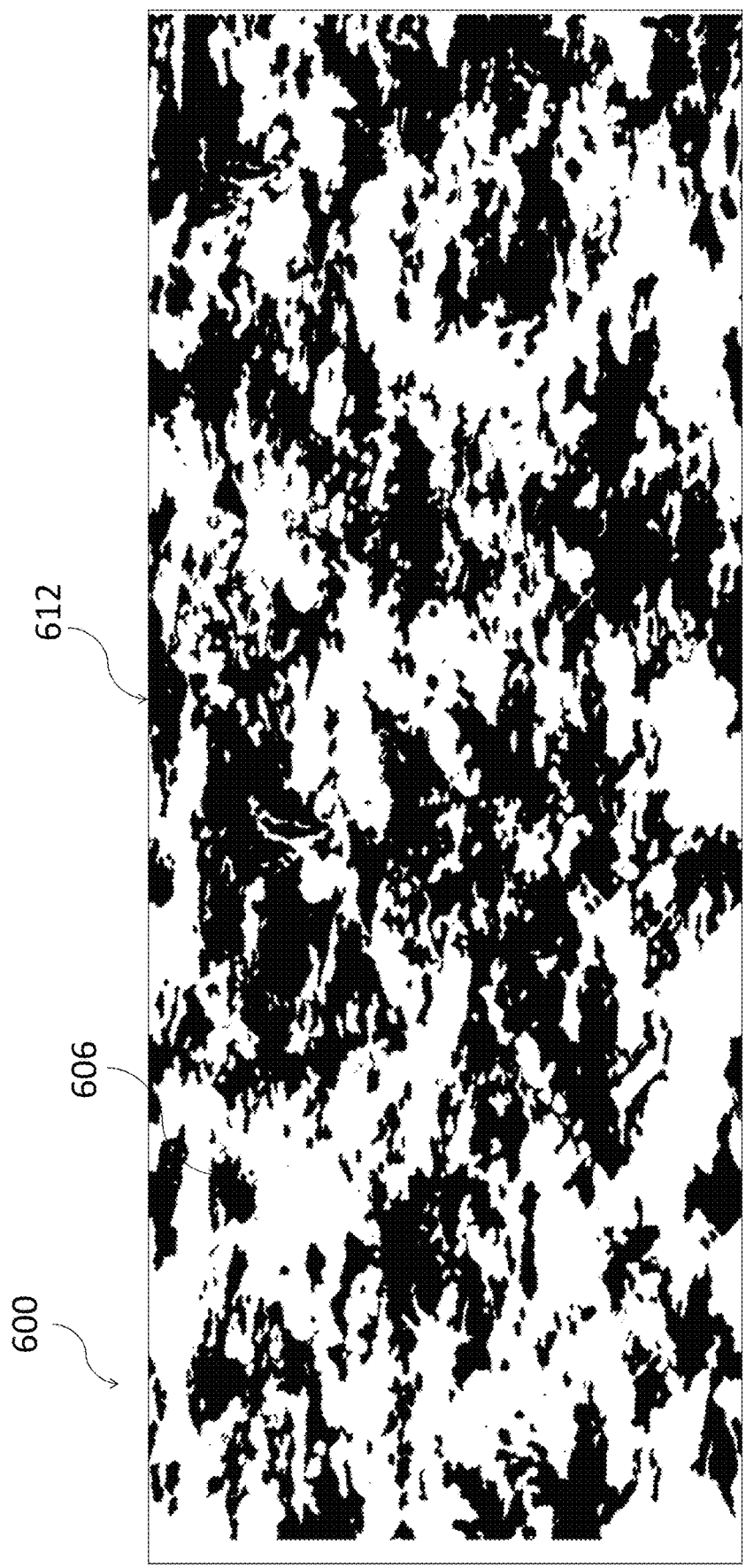
FIG. 6 illustrates one embodiment of an olive color channel for the camouflage pattern shown of the present disclosure.

FIG. 6 illustrates the olive color channel 600. In this example, the pattern repeat 612 of the olive channel 600 includes blotches 606. During the printing of the camouflage pattern 100, the blotches 606 of the olive channel 600 combine with the blotches 506 of the dark green channel 500 in a manner that allows for a gradual blending of the olive color and dark green color to take place within the respective areas of the camouflage pattern 100 shown in FIG. 1.

Figure 7:
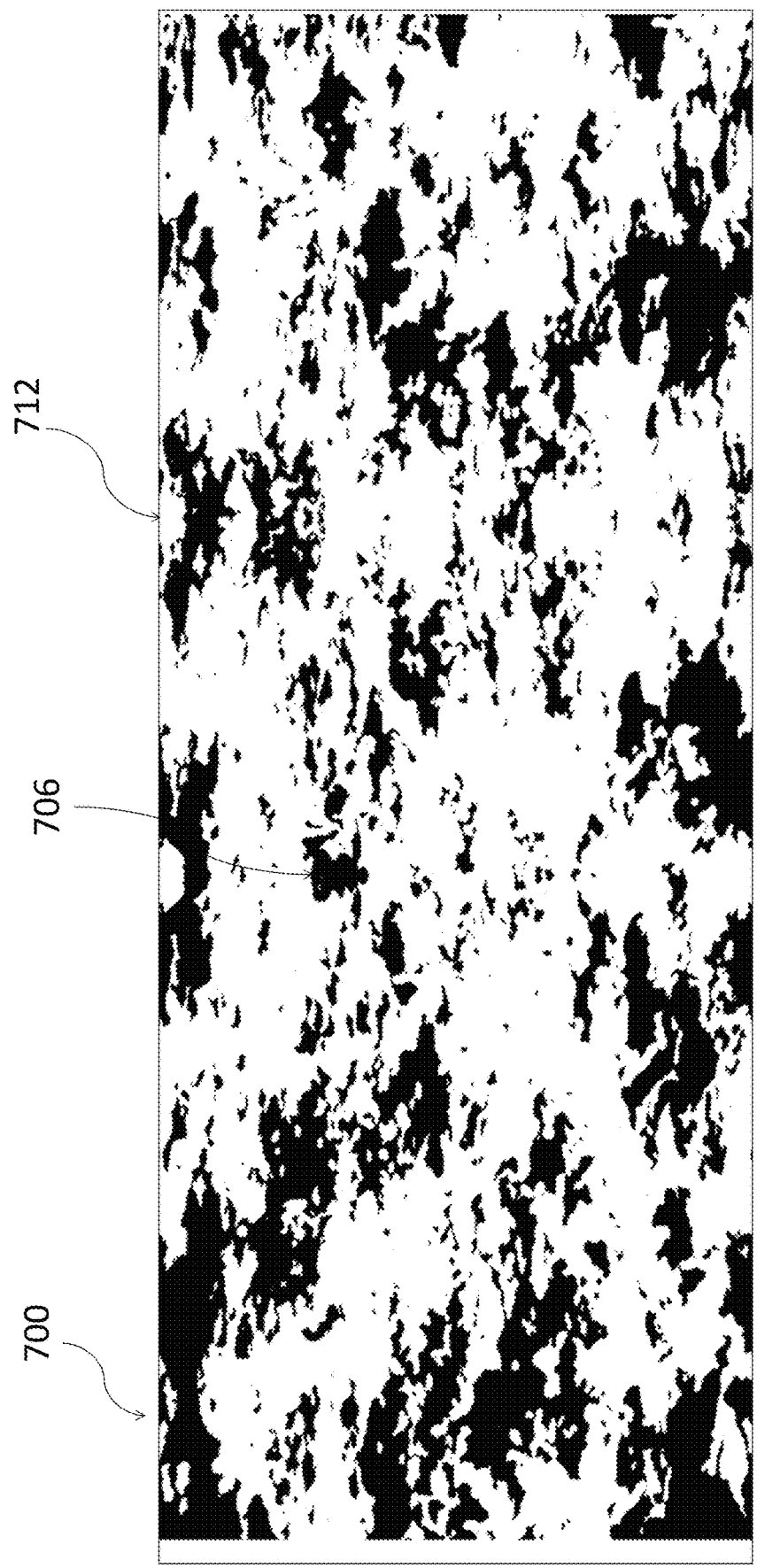
FIG. 7 illustrates one embodiment of a light sage color channel for the camouflage pattern of the present disclosure.

FIG. 7 illustrates the light sage color channel 700. In this example, the pattern repeat 712 of the light sage channel 700 includes blotches 706. During the formation or printing of the camouflage pattern 100, the combination of the light sage channel 700 with the brown channel 200 and the tan channel 800 allows for a gradual blending or combining of the light sage, brown and tan colors to take place within the respective areas of the camouflage pattern 100 of FIG. 1.

Figure 8:
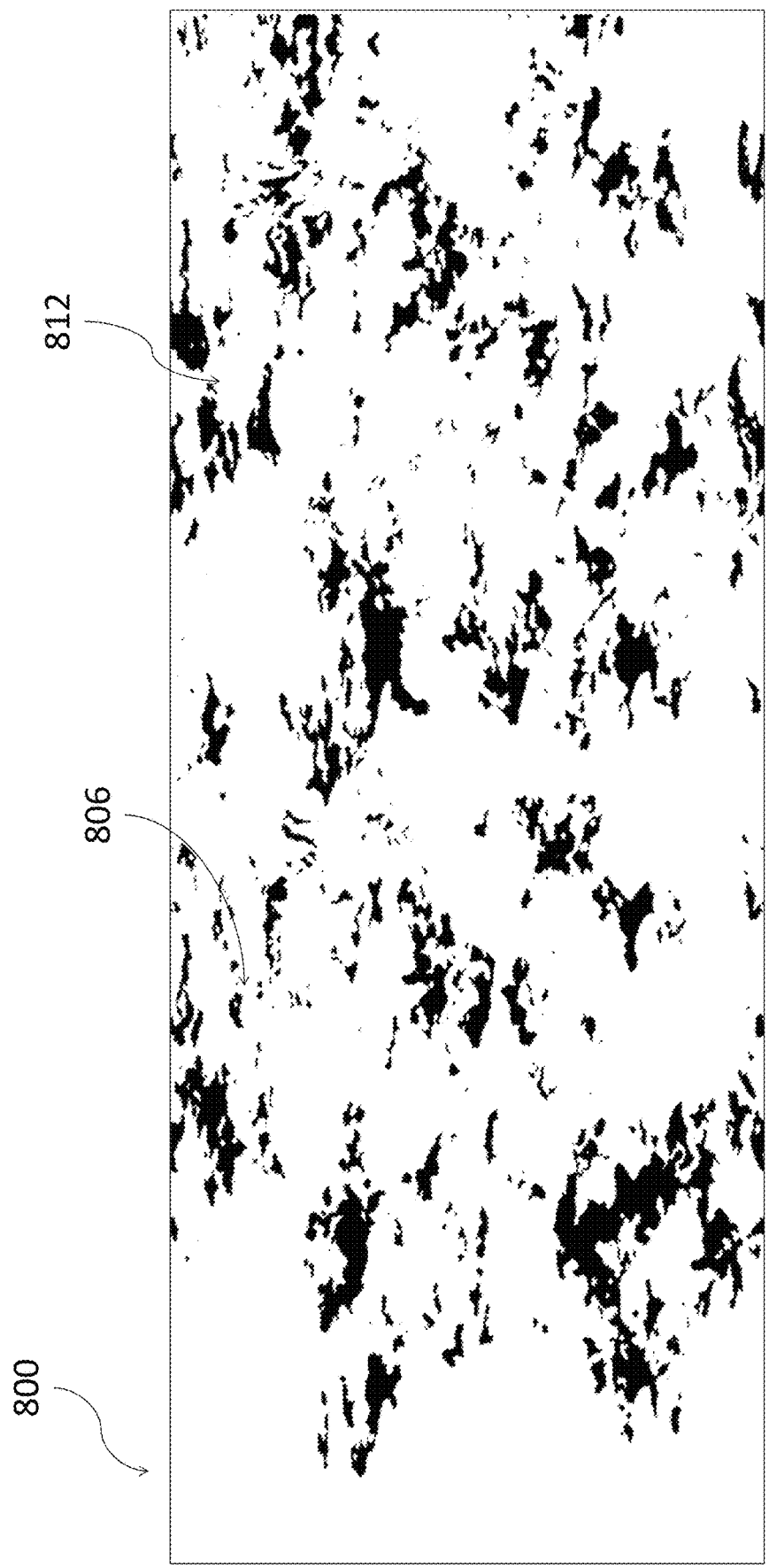
FIG. 8 illustrates one embodiment of a tan color channel for the camouflage pattern shown of the present disclosure.

FIG. 8 illustrates the tan color channel 800. In this example, pattern repeat 812 of the tan channel 800 includes blotches 806. As noted above, the blotches 806 of the tan channel 800 combine with the blotches 206 of the brown channel 200 and the blotches 706 of the light sage channel 700. This allows for a gradual blending or combining of the tan, brown and light sage colors to take place within respective areas of the camouflage pattern 100 of FIG. 1 when the layers 200, 700 and 800 are layered and combined during the printing of the camouflage pattern 100.

Figure 11:
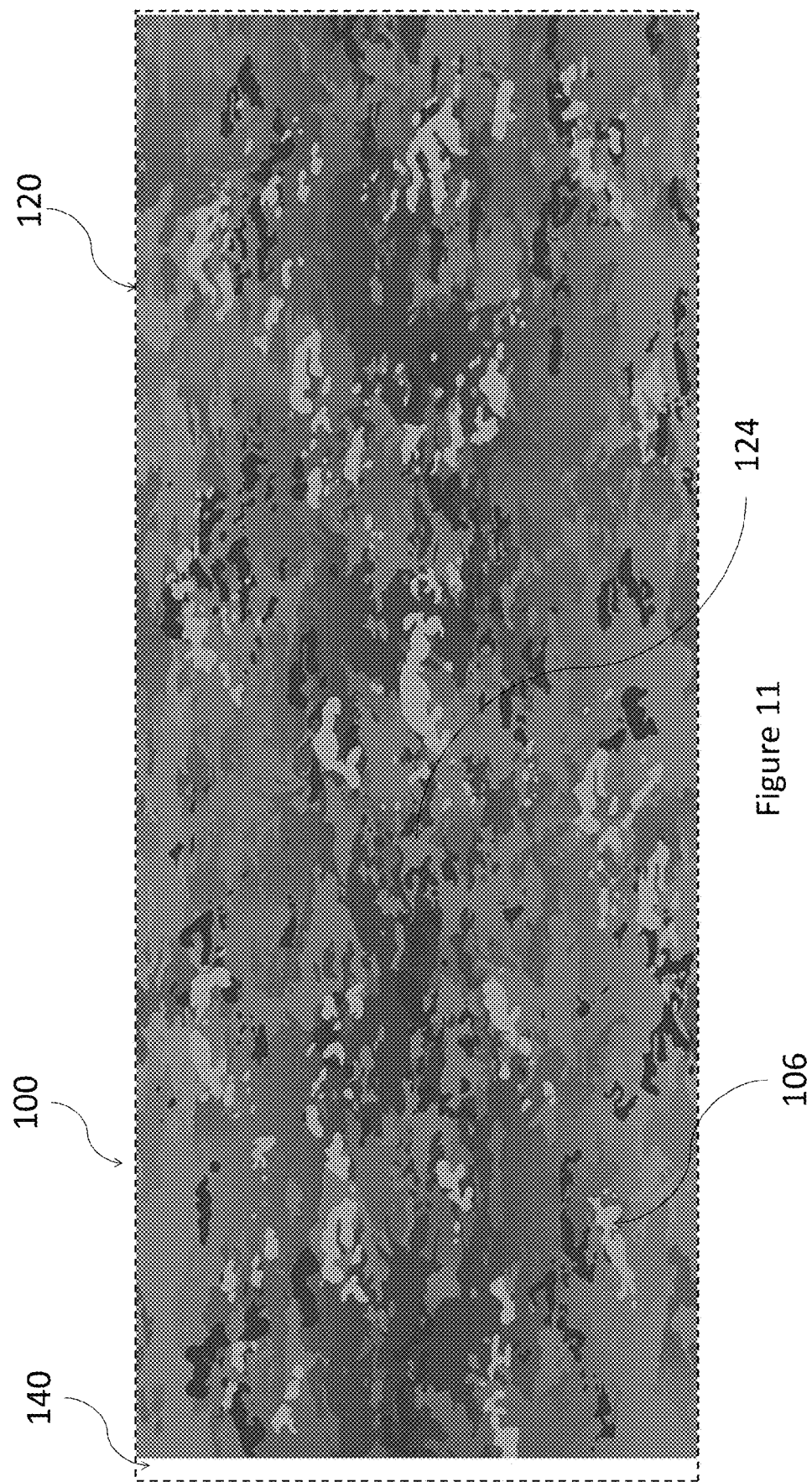
FIG. 11 illustrates the embodiment of FIG. 1 in color.

In the illustrations of FIGS. 1-8, the camouflage pattern 100 and the respective color channels 200-800 are represented in different shades of black. FIG. 11 is a plan view of a single repeat 120 of one embodiment of the camouflage pattern 100 of FIG. 1, in color. A repeat unit 120 of the camouflage pattern 100 is enclosed within the broken lines of the drawing. The broken lines do not form part of the ornamental design of the camouflage pattern 100.

As noted above, the camouflage pattern 100 of the disclosed embodiments makes use of gradients that blends with solid colors, the solid colors of one or more of the color layers 200-800 overlapping each other in the camouflage pattern 100. The use of gradients in this manner gives the appearance to the observer of having many different depths of color without creating a seemingly cluttered pattern that is distracting to the eye. The gradients 210, 510 shown in FIGS. 2A, 2B, 5A and 5B respectively, are increased relative to the 02601 pattern and the '848 Patent to provide a more dramatic difference between the lightest and darkest areas of the camouflage pattern 100 when the color channels 200-800 are combined.

The gradients 210, 510 in the respective color channels 200, 500 of the camouflage pattern 100 are positioned to avoid any signature cues that will draw the eye of the observer. Avoiding signature cues generally means that the blotches 206, 506 in the respective color channels 200, 500 are configured to avoid any single blotch from standing out in the overall pattern, which would otherwise cause the eye to focus on that area because the blotch does not appear to belong there.

As noted earlier, aspects of the camouflage pattern 100 are a result of the combination of the brown color channel 200, the light sage color channel 700 and tan color channel 800. The lighter coloring of the top region 222 of the pattern 212 for the brown color channel 200 shown in FIG. 2A results in the light sage and tan colors showing through from the respective color channels 700, 800.

Figure 2C:
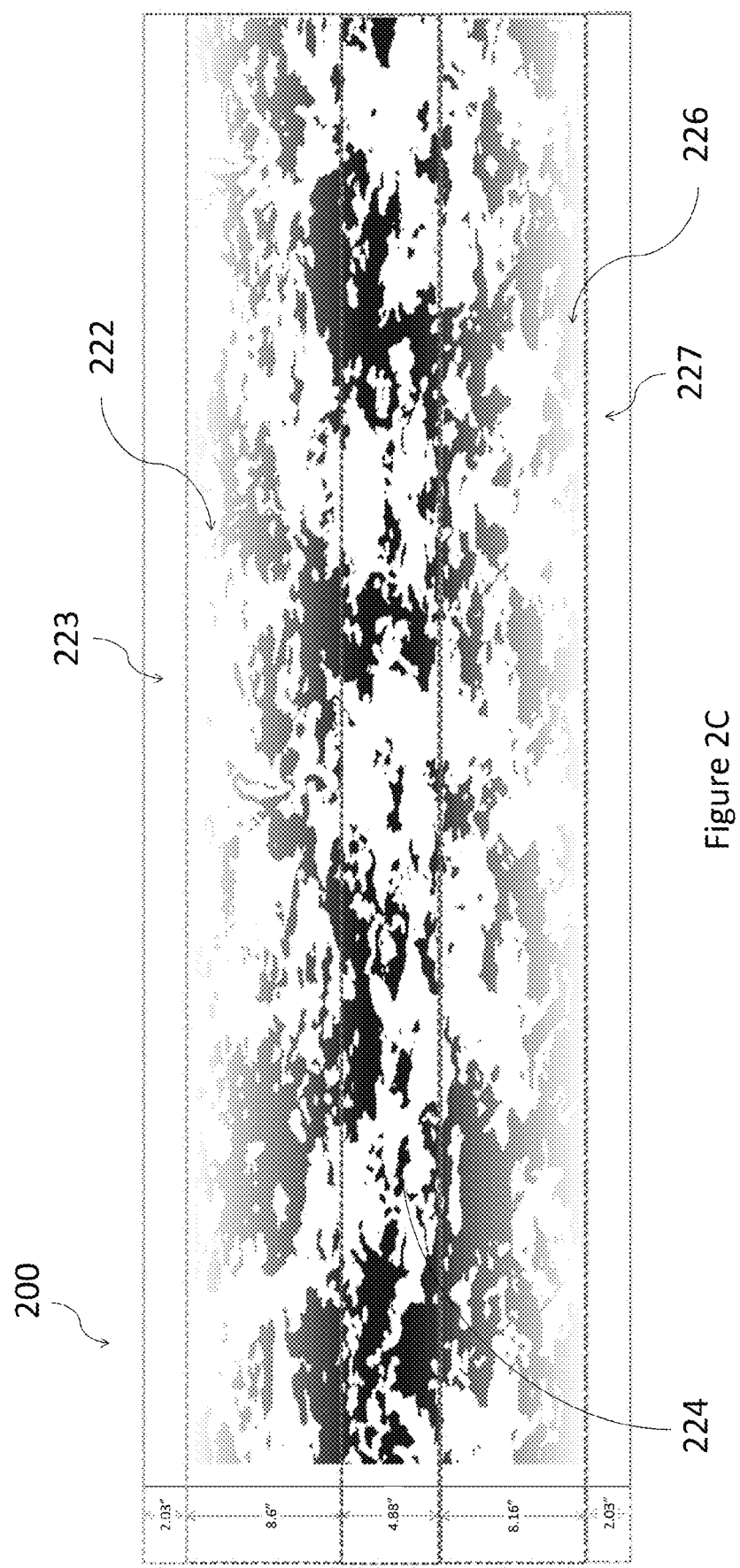
FIG. 2C illustrates exemplary dimensions for the brown color channel illustrated in FIG. 2A.

Referring to FIG. 2C, in one embodiment, the central region 224 of the repeat 230 of the brown color channel 200 has a width in the warp direction of approximately 4.88 inches. There is a distance of approximately 8.16 inches in the warp direction between the central region 224 and an edge of the top region 222 where the saturation level of the brown varies from dark to light. There is also a distance of approximately 8.16 inches in the warp direction between the central region 224 and an edge of the bottom region 226 of the repeat of the pattern 212. Region 223, which is part of the top 224 and region 227, which is part of the bottom region 226 have respective widths in the warp direction of approximately 2.03 inches.

Referring now also to FIG. 5A, when the dark green color channel 500 and the olive color channel 600 are combined, the regions 524 where the dark green channel 500 is the lightest, will allow for the olive color from the olive color channel 600 to show through.

Referring to FIGS. 1, 2A, 7, 8 and 11, while there is a general appearance of more color weighting, or a heavier weighting of the brown color in certain portions, such as the middle region 124 of the camouflage pattern 100. This is nota result of the addition of brown coloring to the brown channel 200 of FIG. 2A, but rather, a blending of the different colors in the different channels that make brown. For example, in one embodiment of the camouflage pattern 100, the blotches 206 combine with the blotches 706 of the light sage channel 700 of FIG. 7 and the blotches 806 of the tan channel 800 of FIG. 8. The lightest regions 222, 226 of the brown channel 200 will provide more or greater transparency to the blotches 706 on the light sage channel 700 and the blotches 806 of the tan channel 800. The lighter coloring of the regions 222, 226 will improve the ability of the blotches 706, 806 to show through in those regions 222, 226 resulting in the camouflage pattern 100.

Figure 9:
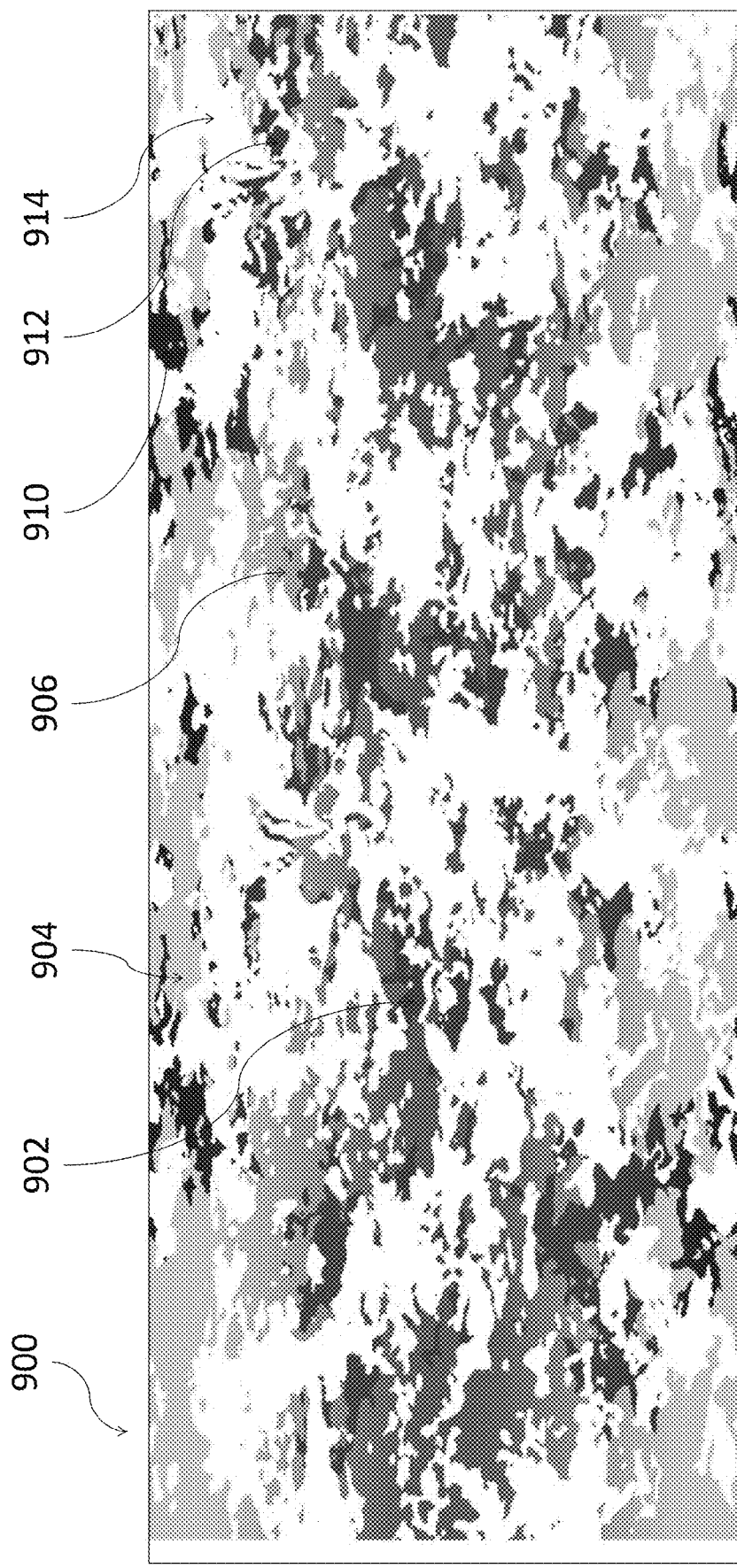
FIG. 9 illustrates an exemplary false color composite showing the overlap of the tan, light sage, and brown channels of the camouflage pattern shown in FIG. 1.

FIG. 9 illustrates an exemplary false color composite 900 of the brown color channel 200, the light sage color channel 700 and the tan color channel 800 overlaid and shows where the colors in the composite pattern 900 occur when the combining or mixing of certain colors occurs. The color brown is represented as red 902, the mix of light sage and brown is represented by yellow 906, and the light sage as green 904. Blue 910 corresponds to the color tan, while purple 912 corresponds to a mix of brown and tan. The white space 914 is filled by one or more of dark cream, bark brown, olive or dark green. The tan and light sage colors, blue 910 and green 904 respectively, do not combine with each other.

Figure 10:
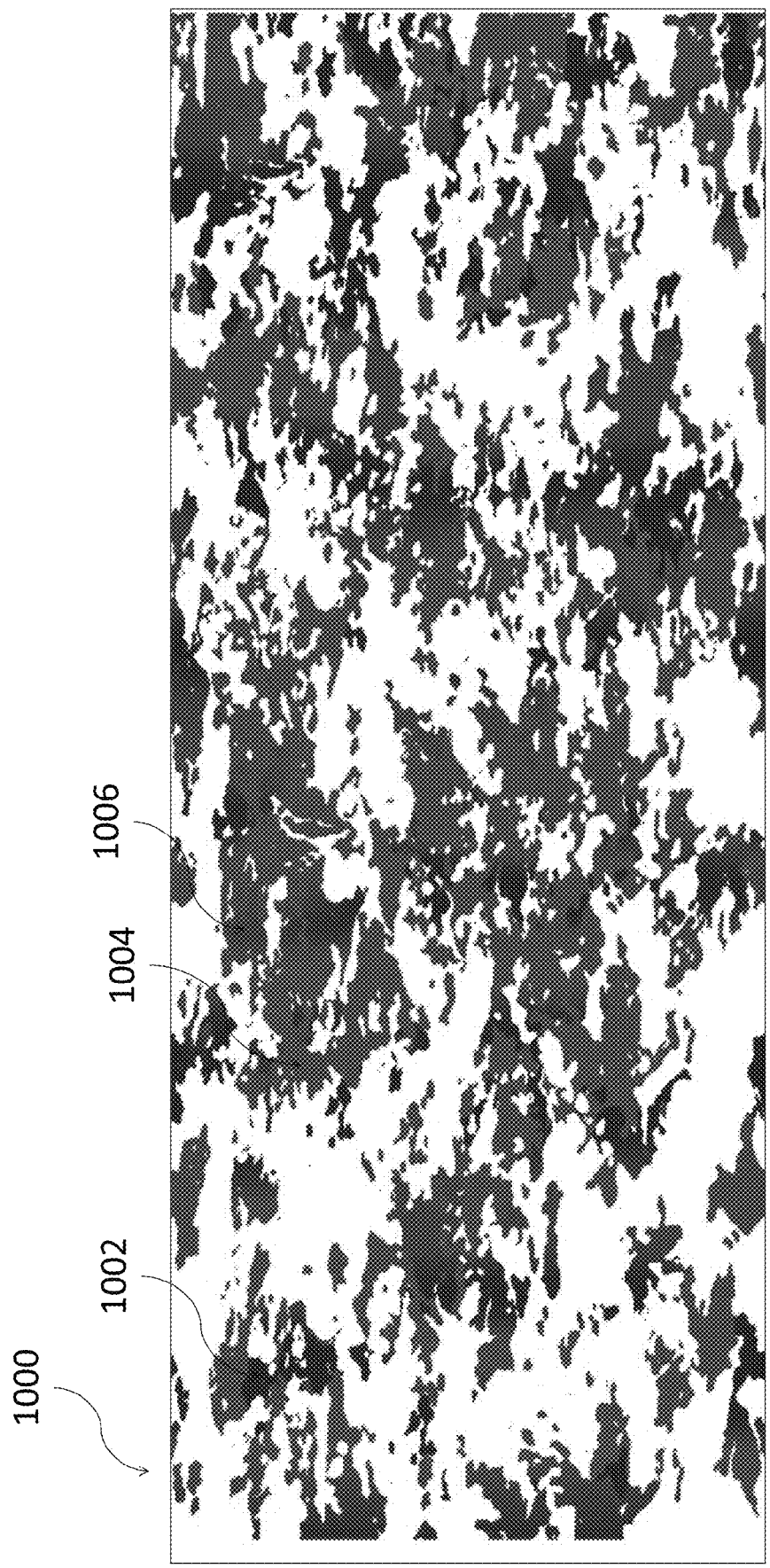
FIG. 10 illustrates an exemplary false color composite showing the overlap of the dark green and the olive color channels of the camouflage pattern of FIG. 1.

FIG. 10 is an exemplary false color composite 1000 illustrating the overlap of the dark green channel 500 and the olive channel 600. The dark green color is illustrated by the blue 1002 and the olive color by the red 1004. The false color composite 1000 shows where the colors occur resulting from the combination of the blotches 506, 606 of the dark green channel 500 and olive channel 600. The combination of colors is illustrated by the purple areas 1006.

As illustrated by the different color channels 200-800 of the camouflage pattern 100, through the use of gradients in the horizontal and vertical directions across the repeat of the patterns, and in combination with larger blotches of colors, the improved effectiveness of the camouflage pattern 100 of the disclosed embodiments is achieved. This allows the soldier wearing a garment with the camouflage pattern 100 applied thereto, to blend into various "transitional" environments, as described above.

The enlargement of the size of the blotches in the different color channels 200-800 improves the ability of the camouflage pattern 100 to blend in with larger clutter that may be apparent in a scene. Increasing the amount of area used in the camouflage pattern 100 by colors that are of highest contrast to each other improves the effective range of the camouflage pattern 100.

The pattern 100 of the present disclosure and the pattern of the '848 Patent are composed of seven color channels, as shown in Table 1, referred to earlier. In Table 1, color 6 of the '848 Patent generally corresponds to the bark brown color channel 200 of the camouflage pattern 100, and color 7 of the '848 Patent generally corresponds to the dark cream color channel 300 of the camouflage pattern 100.

The average size of the cream colored blotches in the pattern of the '848 Patent is approximately 25621 pixels. The average size of the dark cream colored blotches in the pattern 100 of the present disclosure is approximately 38031 pixels, an increase of approximately 19.5% over the '848 Patent. The average size of all of the dark brown colored blotches in the pattern of the '848 Patent is approximately 11639 pixels. The average size of all of the bark brown colored blotches in the pattern 100 is 16851, an increase of approximately 18.3% over the '848 Patent.

The ranges of percentages of color for one embodiment of the camouflage pattern 100 of FIG. 1, is generally defined in Table 2, below. The column labeled "Scorpion W2 (a.k.a. OCP) Pattern" illustrates the color percentages in the preferred embodiment of camouflage pattern 100. "OCP" stands for the Operational Camouflage Pattern.

TABLE 2

| COLOR | Minimum in Warp Direction (22.75" Repeat) | Scorpion W2 (a.k.a. OCP) Pattern (25.25" Repeat) | Maximum in Warp Direction (26.5" Repeat) |
|---|---|---|---|
| Olive 527 | 19.5% | 21.6% | 22.7% |
| Dark Green 528 | 12.9% | 14.3% | 15% |
| Light Sage 560 | 10.9% | 12.1% | 12.7% |
| Tan 525 | 2.3% | 2.5% | 2.6% |
| Brown 529 | 11.1% | 12.4% | 13% |
| Bark Brown 561 | 6.9% | 7.7% | 8.1% |
| Dark Cream 559 | 6.0% | 6.6% | 6.9% |
| Combination: Dark Green 528 - Olive 527 | 8.1% | 9.0% | 9.5% |
| Combination: Brown 529 - Light Sage 560 - Tan 525 | 12.4% | 13.8% | 14.4% |
| Actual Size | 90.0% | 100% | 105.0% |

Each color is a percentage of the overall pattern. Typically, all the colors within the pattern add up to 100%, except in the case of tonal/gradient type patterns, where the total colors may exceed 100%. As is reflected in Table 2, the percentage of the color of the bark brown channel 400 in the camouflage pattern 100 is approximately 7.7%. As is also shown in Table 2 above, the percentage of the color in the dark cream channel 300 of the camouflage pattern 100 is approximately 6.6%. The color percentage results illustrated in Table 2 were arrived at using the Adobe Photoshop™ process described earlier herein.

The percentages and pattern repeat dimensions listed in Table 2 above are intended to be representative or approximate. The calculations used to find the values in Table 2 also assume that any corresponding changes in the warp or length direction also occur in the fill or width direction. For example, if the pattern repeat is 90% from one element to the same element in the next pattern repeat, the calculations in Table 2 assume that the distances from left to right are also 90% of what would be found in the original pattern.

Referring to FIG. 11, the camouflage pattern 100 consists of blotches 106 that repeat, also referred to herein as a pattern repeat 120. As noted, the blotches 106 of the camouflage pattern 100 are generally horizontally oriented in the fill direction of the pattern repeat 120. The blotches 106 are not vertically oriented in the warp direction of the pattern repeat 120 as is generally the case of the blotches of the '861, '909 and '915 patents. In one embodiment, the pattern repeat 120 will comprise an area measuring approximately 65.028 inches in the fill direction by 25.256 inches in the warp direction. The maximum dimensions of the repeat 120 of pattern 100 will be approximately 68 inches by 26.506 inches. In alternate embodiments, the size and area of the pattern repeat 120 can comprise any suitable dimensions.

In the development of the camouflage pattern 100 of the present disclosure, the W20601 pattern repeat in its entirety was reduced in one direction to fit on an approximately 25.25" vertical repeat (warp direction), down from an approximately 28.5" vertical repeat. The horizontal measurement (fill direction) remained stable at approximately 66.2", including the selvages. The changes to the size of the pattern repeat of the camouflage pattern 100 of the present disclosure enables, among other things, easier implementation by textile printers so the pattern can be reproducible onto fabrics and substrates by additional printers.

FIG. 11 illustrates the application of the camouflage pattern 100 of the disclosed embodiments to a surface of a sheet material or substrate 140, also referred to as selvage, showing the camouflage pattern 100 in color. The sheet material or substrate 140 can include any suitable item or object that is configured to make use of camouflage. In one embodiment, the substrate 140 includes a fabric material on which the camouflage pattern 100 is applied, such as by printing of the layers 200-800. The fabric material of the substrate 140 in this example can include any fiber blend used to construct textiles for clothing and individual equipment.

Figure 12:
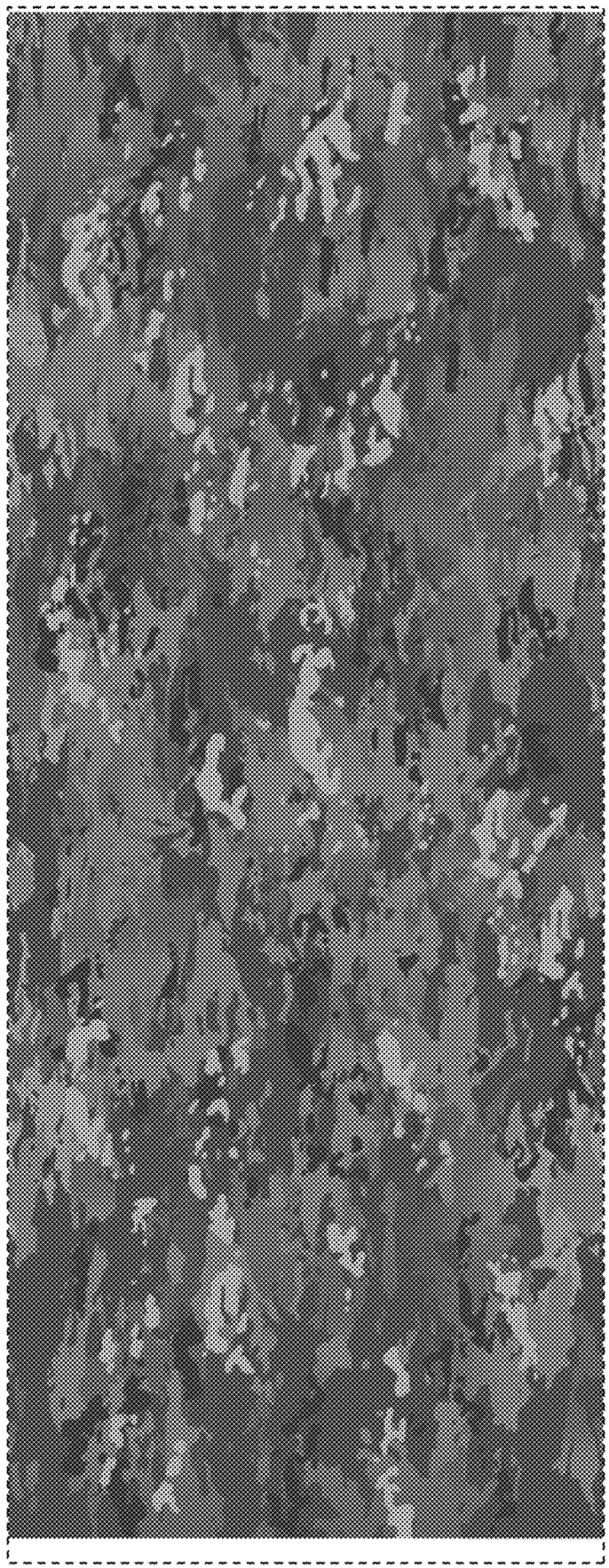
FIG. 12 illustrates one embodiment of a six-color operational camouflage pattern incorporating aspects of the present disclosure, in grayscale
Figure 13:
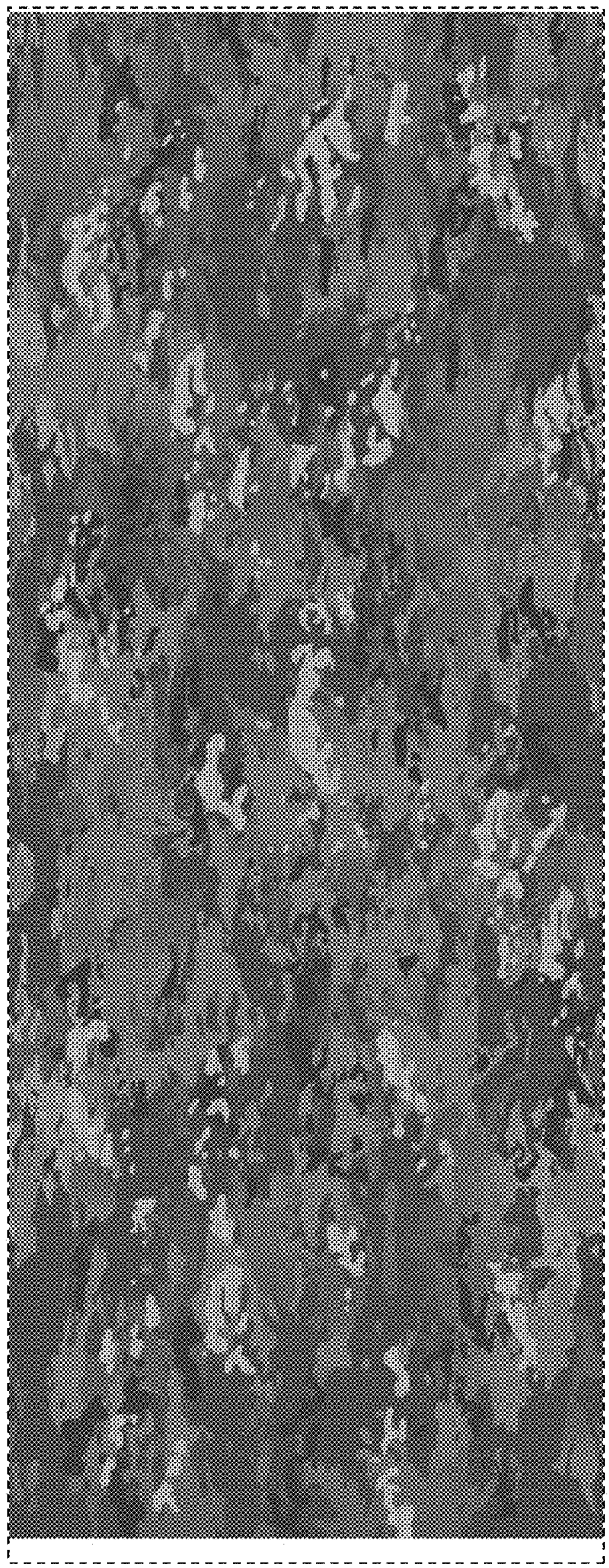
FIG. 13 illustrates the embodiment of FIG. 12 in color.

Helmet covers are a fitted textile that will envelope a soldier's issued helmet. Helmet covers may be constructed with a nylon-cotton twill fabric, a material that is able to stretch to fit the round contour of the helmet. In accordance with a feature of the present invention, a six-color variant of the camouflage pattern 100 was found to enhance a particular uniformity of the colors over a smaller area of the current pattern, e.g., for use in the making of helmet covers. FIG. 12 illustrates a grayscale version of one embodiment of a 6-color camouflage pattern 160. FIG. 13 illustrates the camouflage pattern 160 of FIG. 12, in color. As will be described in more detail below, the 6-color camouflage pattern 160 may be applied to the helmet cover 158 of the helmet 156 illustrated in FIG. 15. It will be understood that the 6-color camouflage pattern 160 may be printed on a fabric head cover, such as a hunter's hat or even directly printed onto a helmet.

Figure 14:
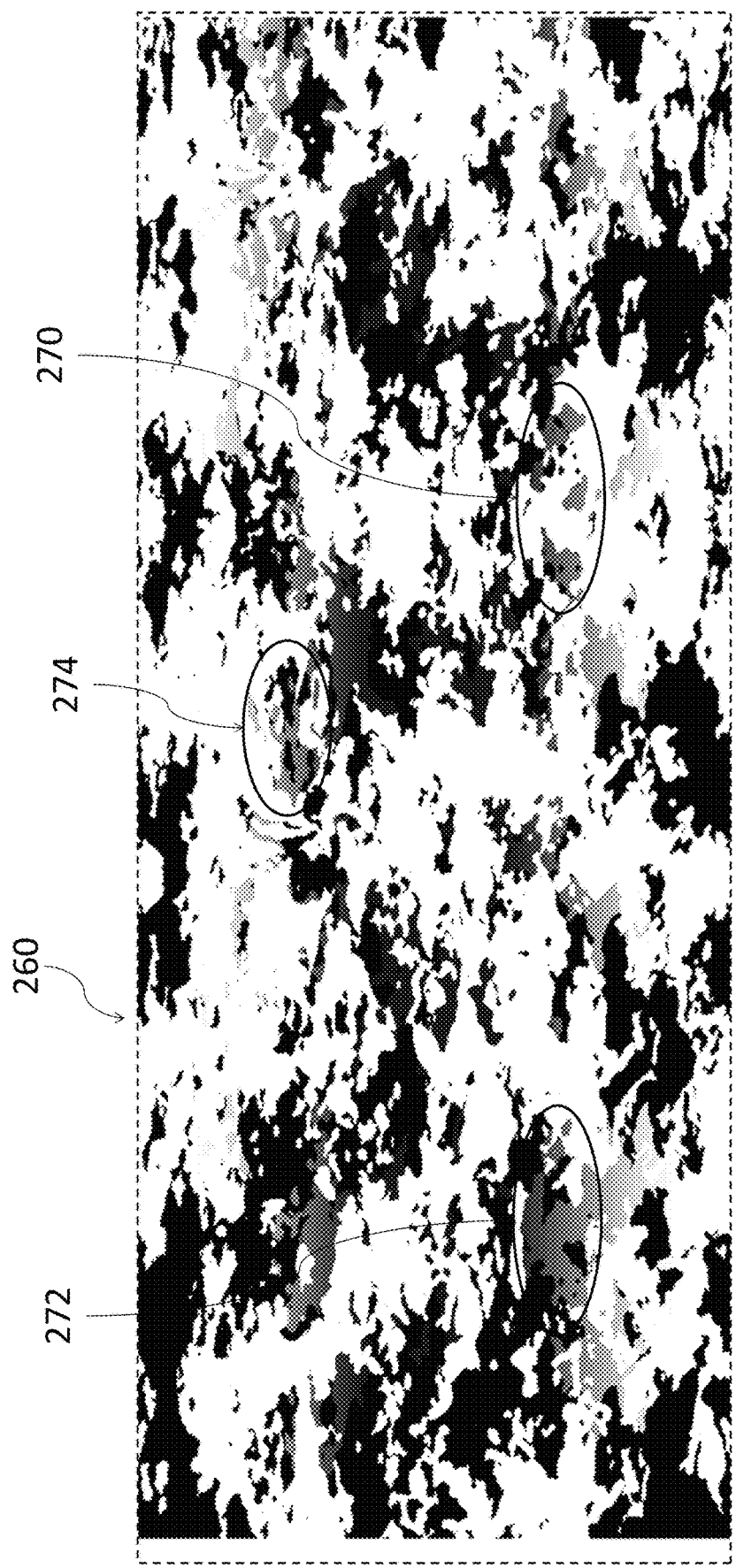
FIG. 14 illustrates one embodiment of a brown color channel for the six-color operational camouflage pattern of FIGS. 12 and 13.

The color channels of the 6-color camouflage pattern 160 include a brown color channel 260 shown in FIG. 14, the dark cream color channel 300 of FIG. 3, the bark brown color channel 400 of FIG. 4, the dark green color channel 500 of FIG. 5, the olive color channel 600 of FIG. 6, and the tan color channel 800 of FIG. 8. The 6-color camouflage pattern 160 does not include the brown color channel 200 of FIG. 2 and the light sage color channel 700 of FIG. 7.

FIG. 14 illustrates one embodiment of the brown color channel 260 for the 6-color camouflage pattern 160 of the present disclosure. In this example, the pattern repeat 262 of the brown color channel 260 of the 6-color camouflage pattern 160 replaces the patterns previously provided by the pattern repeat 212 of the brown color channel 200 and pattern repeat 712 of the light sage color channel 700. The brown channel 260 for the 6-color pattern 160 replaces both the original brown channel 200 and the light sage channel 700 in an effort to make the helmet covers appear cut and sewn from the darker regions of the pattern repeat.

Because the original brown channel 200 in the 7-color camouflage pattern 100 combined with both the tan channel 800 and the pale green channel 700, the gradient or faded region occurring between the brown channel 200 of FIG. 2 and the tan color channel 800 of FIG. 8 had to be preserved to ensure aesthetic compatibility with the camouflage pattern 100 used in uniforms and other individual equipment. Regions 270, 272, and 274 of FIG. 14 are examples of areas where the fading was modified to ensure aesthetic compatibility among the blotches where the colors were modified. The gradient in this brown channel 260 affects only the blotches that are shared with the tan color layer 800 of FIG. 8, the remaining areas of the channel are uniform in coverage.

Table 3 below illustrates the ranges of percentages of color for one embodiment of the 6-color camouflage pattern 160 of FIGS. 12-13.

TABLE 3

|  | Minimum in Warp Direction −2.50" OCP/W2- Scorpion 6- Color - 90% (22.75" repeat) Tolerance: 10 | Original Pattern ±0 OCP/W2- Scorpion 6- Color - 100% (25.25" Repeat) Tolerance: 10 | Maximum in Warp Direction +1.25" OCP/W2- Scorpion 6- Color - 105% (26.5" repeat) Tolerance: 10 |
|---|---|---|---|
| Olive 527 | 18.4% | 20.5% | 21.5% |
| Dark Green 528 | 12.9% | 14.3% | 15.0% |
| Light Sage 560 | 0.0% | 0.0% | 0.0% |
| Tan 525 | 2.4% | 2.6% | 2.8% |
| Brown 529 | 28.7% | 31.9% | 33.5% |
| Bark Brown 561 | 6.9% | 7.7% | 8.1% |
| Dark Cream 559 | 6.0% | 6.6% | 6.9% |
| Combination: Dark Green 528 - Olive 527 | 8.8% | 9.8% | 10.2% |
| Combination: Brown 529 - Tan 525 | 5.9% | 6.6% | 6.9% |
| actual size | 90.0% | 100.0% | 105.0% |

The color percentages in Table 3 above were obtained using the Adobe Photoshop™ computer graphics editor, as described above.

Figure 15:
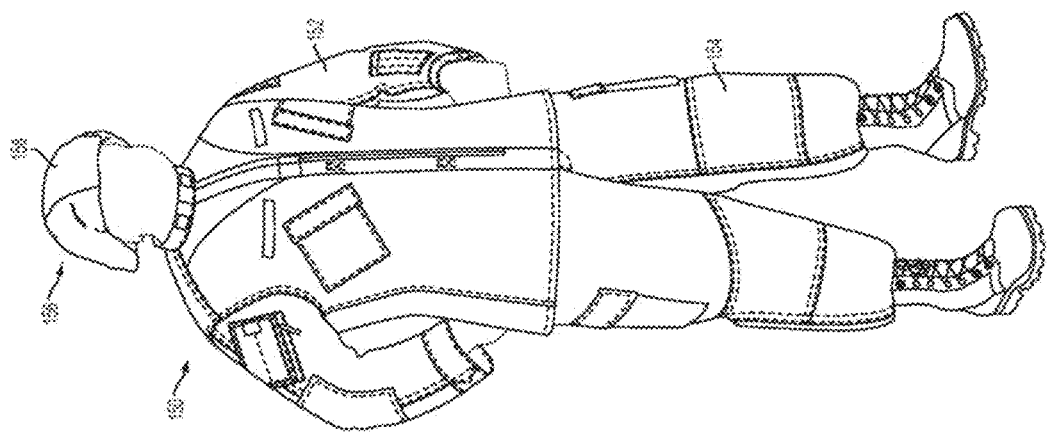
FIG. 15 illustrates a perspective view of one embodiment of an exemplary uniform to which the camouflage pattern of the present disclosure can be applied.

The preferred embodiment of the present disclosure is a military field combat uniform, and in particular, the coat and trousers of the uniform with its associated accessories. These can include for example, but are not limited to, helmets, boots and packs. FIG. 15 illustrates a plan view of one embodiment of a uniform 150 to which the camouflage patterns 100 and 160 have been applied. The uniform 150 shown in FIG. 15 includes a coat 152, trousers 154 and helmet 156. The helmet 156 includes a helmet cover 158. The coat 152 is the top that goes over an undershirt in an Army Combat Uniform. The broken lines showing a person in FIG. 15 are for illustrative purposes only and form no part of the ornamental design of the camouflage patterns 100 or 160. The broken lines illustrating the stitching and seams of the uniform 150 in FIGS. 15-27 are for illustrative purposes only and form no part of the ornamental design of the camouflage patterns 100 and 160.

Figure 16A:
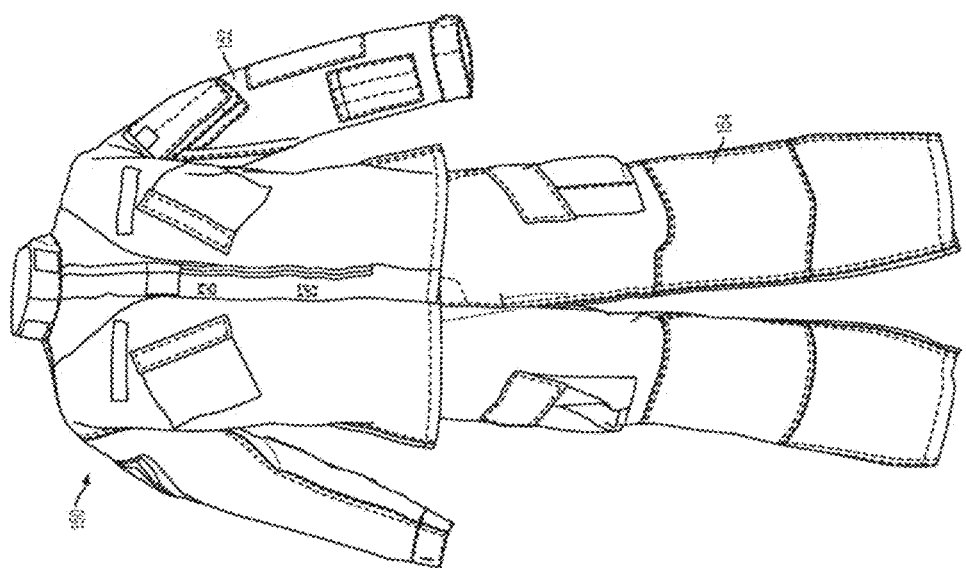
FIG. 16A illustrates a front view of the uniform shown in FIG. 15.
Figure 16B:
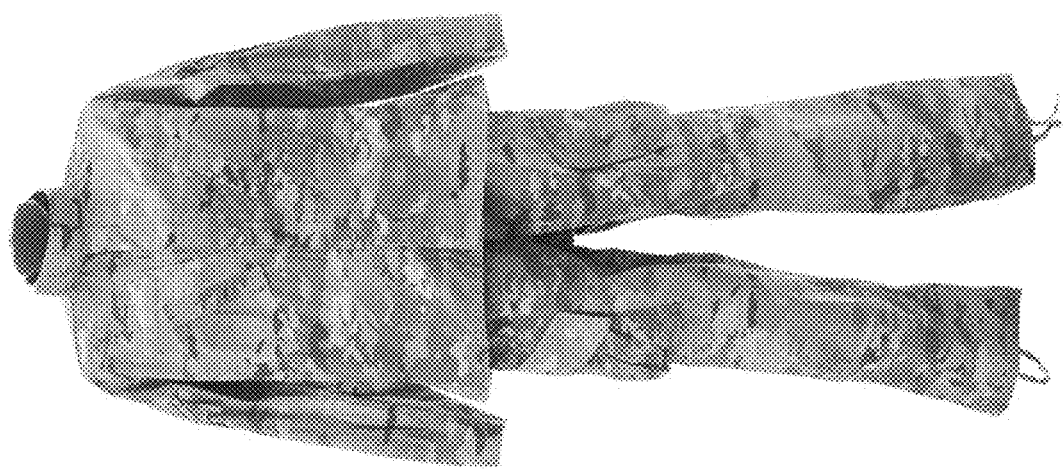
FIG. 16B illustrates the application of the 7-color operational camouflage pattern of the present disclosure to the front of the uniform shown in FIG. 16A, the camouflage pattern being shown in color.

FIG. 16A is a front view of the uniform 150 shown in FIG. 15. FIG. 16B illustrates the front view of the uniform 150 with the 7-color camouflage pattern 100 applied thereto.

Figure 17A:
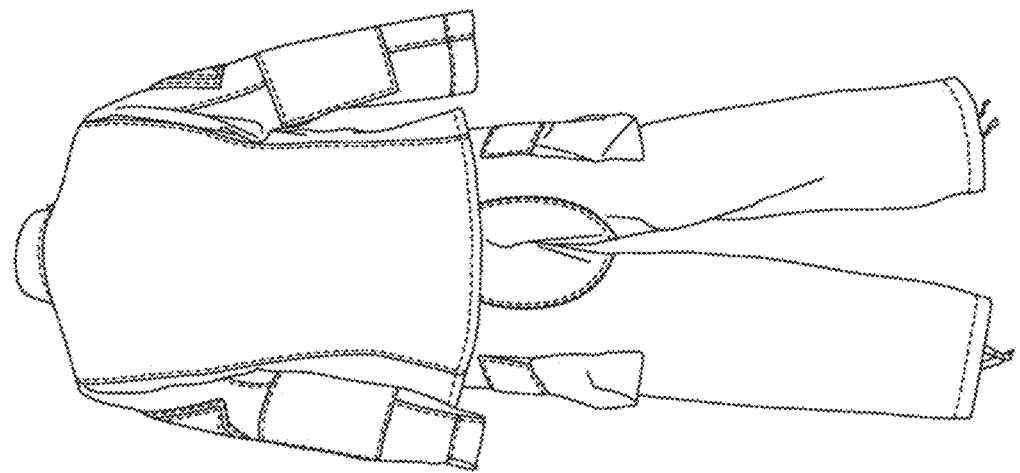
FIG. 17A illustrates a rear view of the uniform shown in FIG. 15.
Figure 17B:
FIG. 17B illustrates the application of the 7-color operational camouflage pattern of the present disclosure to the rear of the uniform shown in FIG. 17A, the camouflage pattern being shown in color.

FIG. 17A is a rear view of the uniform 150. FIG. 17B illustrates the rear view of the uniform 150 with the 7-color camouflage pattern 100 applied thereto.

Figure 18A:
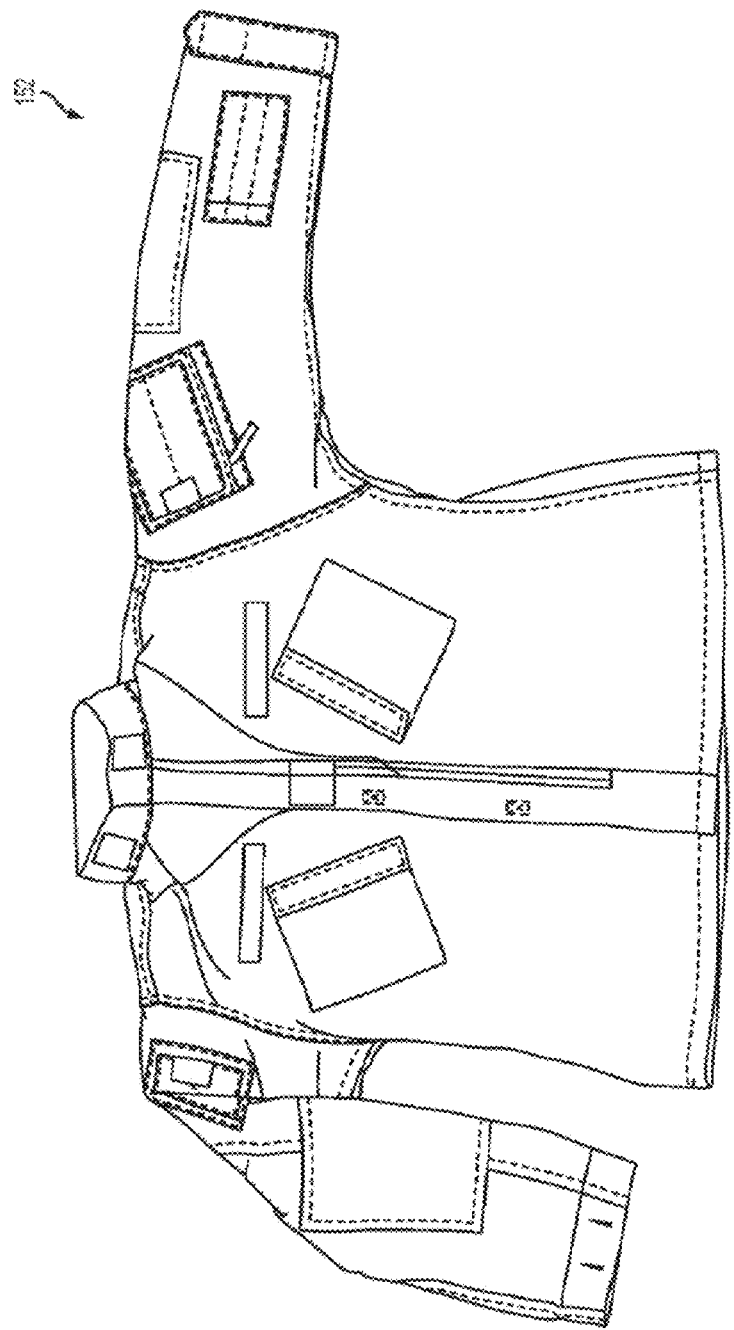
FIG. 18A is a front view of the coat of the exemplary uniform shown in FIG. 15.
Figure 18B:
FIG. 18B illustrates the application of the 7-color operational camouflage pattern to the front of the coat illustrated in FIG. 18A, the camouflage pattern being shown in color.

FIG. 18A is a front view of the coat 152 of the uniform 150. FIG. 18B illustrates the front view of the coat 152 with the 7-color camouflage pattern 100 applied thereto.

Figure 19A:
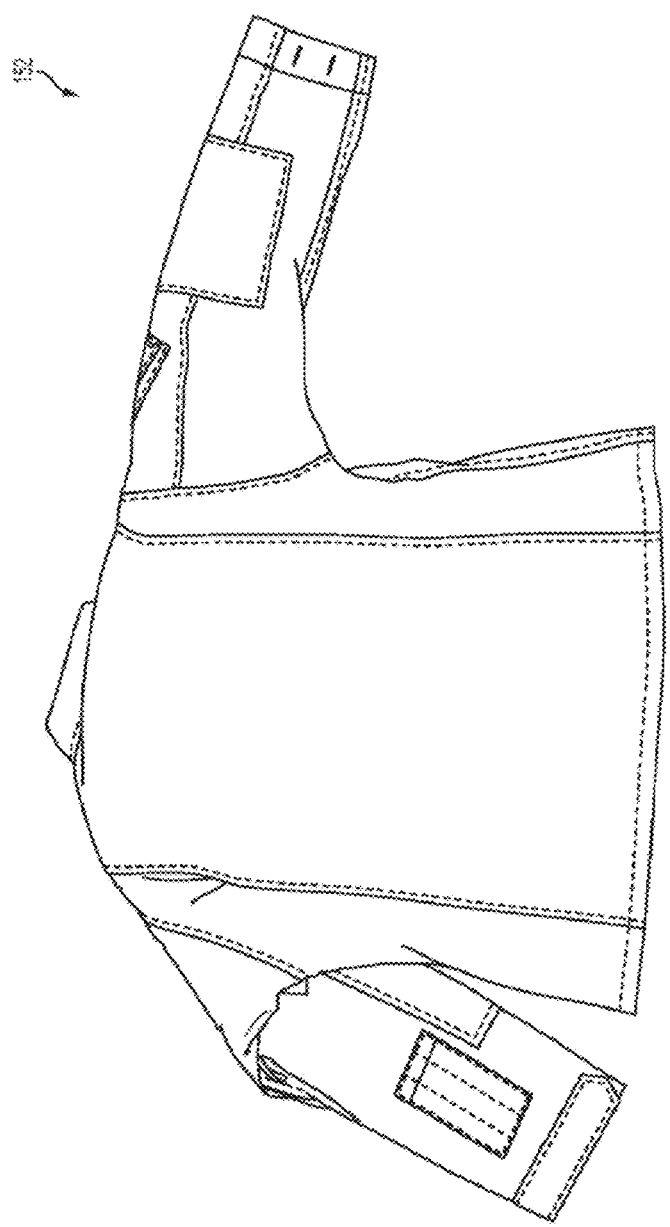
FIG. 19A is rear view of the coat illustrated in FIG. 15.
Figure 19B:
FIG. 19B illustrates the application of the 7-color operational camouflage pattern of the present disclosure to the rear of the coat shown in FIG. 19A, the camouflage pattern being shown in color.

FIG. 19A is a rear view of the coat 152 of the uniform 150. FIG. 19B illustrates the rear view of the coat 152 with the 7-color camouflage pattern 100 applied thereto.

Figure 20B:
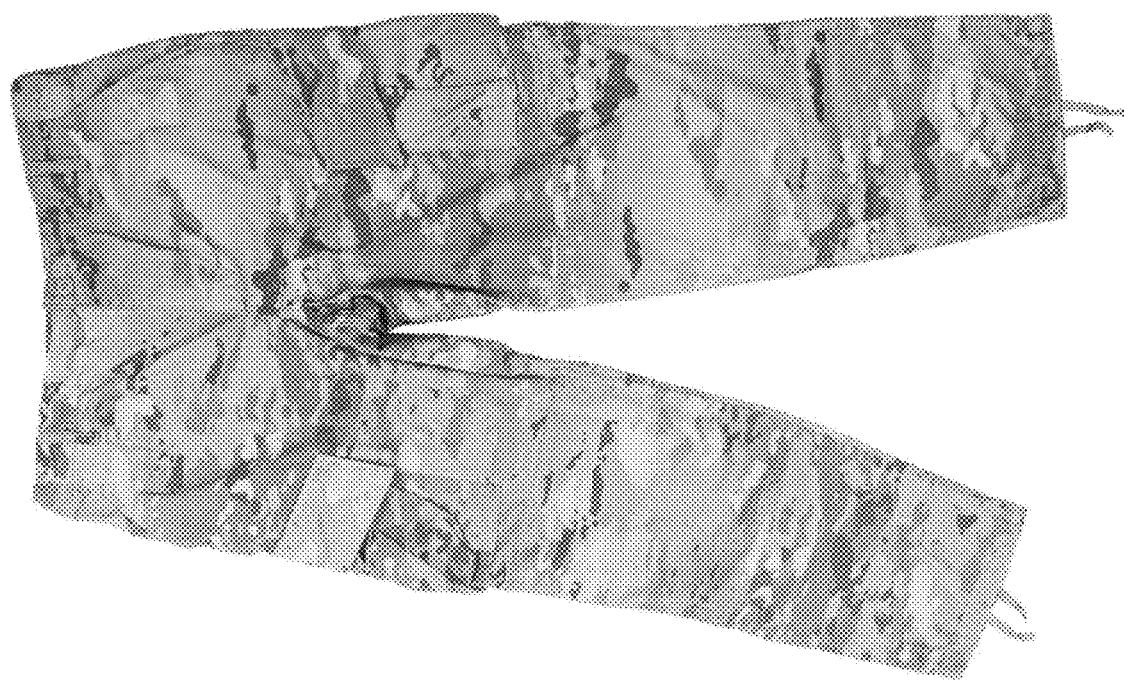
FIG. 20B illustrates the application of the 7-color operational camouflage pattern of the present disclosure to the front of the trousers shown in FIG. 20A, the camouflage pattern being shown in color.

FIG. 20A is a front view of the trousers 154 of the uniform 150. FIG. 20B illustrates the front view of the trousers 154 with the 7-color camouflage pattern 100 applied thereto.

Figure 21A:
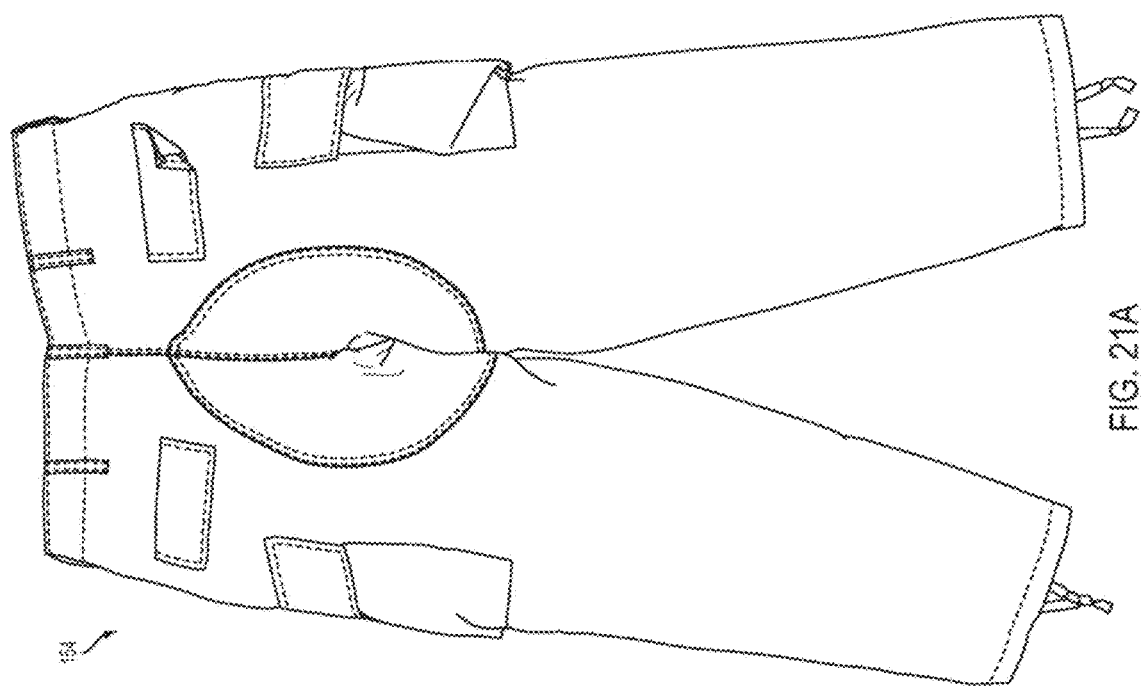
FIG. 21A is a rear view of the trousers illustrated in FIG. 15.
Figure 21B:
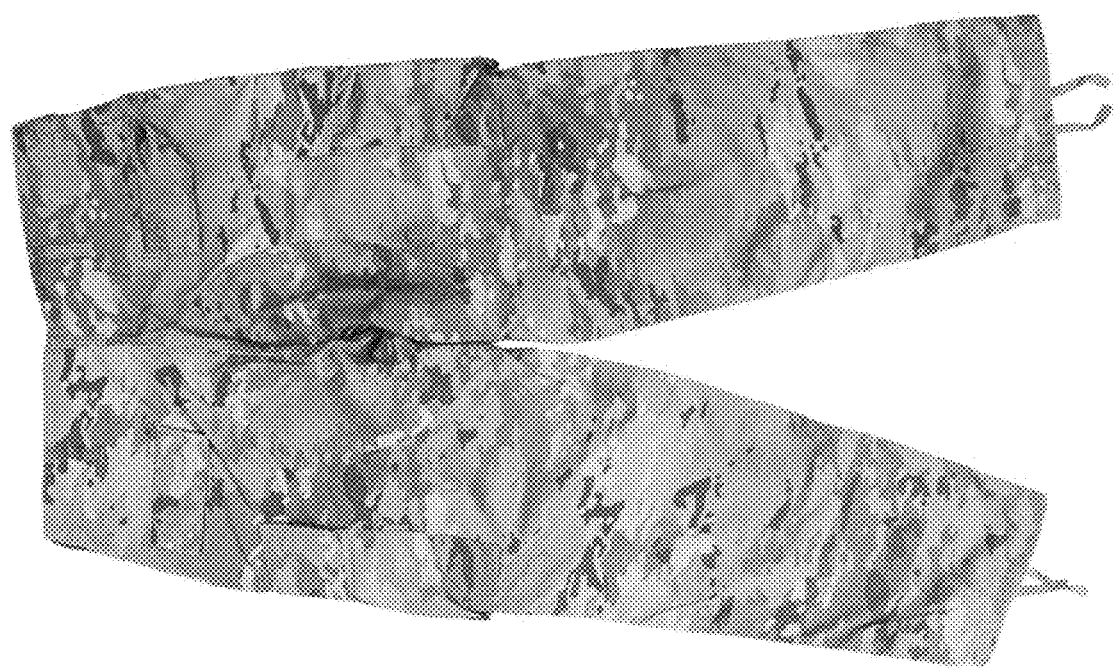
FIG. 21B illustrates the application of the 7-color operational camouflage pattern to the rear of the trousers illustrated in FIG. 21A, the camouflage pattern being shown in color.

FIG. 21A is a rear view of the trousers 154 of the uniform 150. FIG. 21B illustrates the rear view of the trousers 154 with the 7-color camouflage pattern 100 applied thereto.

Figure 22A:
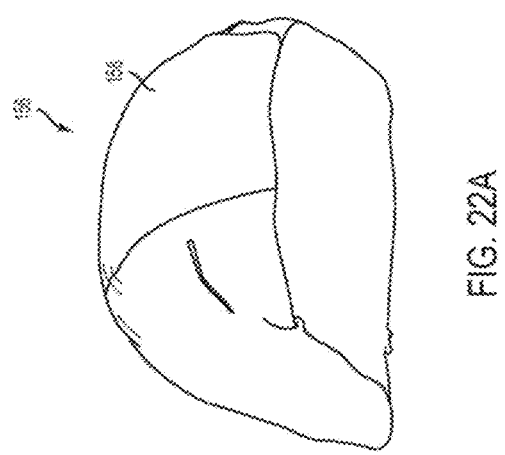
FIG. 22A is a front perspective view of the helmet and helmet cover illustrated in FIG. 15.
Figure 22B:
FIG. 22B illustrates the application of the 6-color camouflage pattern of the present disclosure to the helmet cover shown in FIG. 22A, the camouflage pattern being shown in color from a slightly different perspective than that of FIG. 22A.

FIG. 22A is a perspective view of the helmet 156 illustrated in FIG. 15. FIG. 22B illustrates the application of one embodiment of the 6-color camouflage pattern 160 of the present disclosure to the helmet cover 158 of the helmet 156.

Figure 23A:
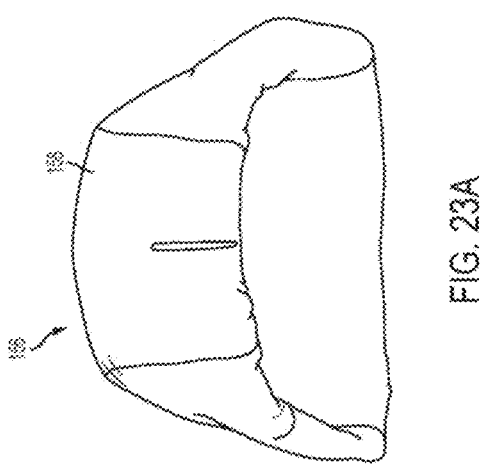
FIG. 23A is a front view of the helmet and helmet cover illustrated in FIG. 15.
Figure 23B:
FIG. 23B illustrates the application of the 6-color camouflage pattern of the present disclosure to the front of the helmet cover shown in FIG. 23A, the camouflage pattern being shown in color.

FIG. 23A is a front view of the helmet 156. FIG. 23B illustrates the application of the 6-color camouflage pattern 160 of the present disclosure to the front portion of the helmet cover 158.

Figure 24A:
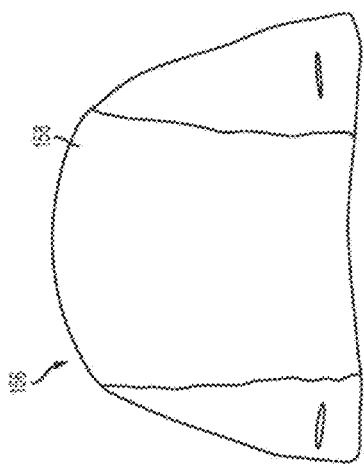
FIG. 24A is a rear view of the helmet and helmet cover illustrated in FIG. 15.
Figure 24B:
FIG. 24B illustrates the application of the 6-color camouflage pattern of the present disclosure to the rear of the helmet cover shown in FIG. 24A, the camouflage pattern being shown in color.

FIG. 24A is a rear view of the helmet 156. FIG. 24B illustrates the application of the 6-color camouflage pattern 160 of the present disclosure to the rear portion of the helmet cover 158.

Figure 25A:
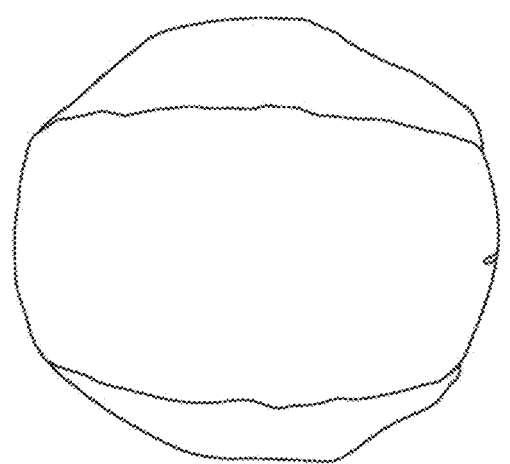
FIG. 25A is a top view of the helmet and helmet cover illustrated in FIG. 15.
Figure 25B:
FIG. 25B illustrates the application of the 6-color camouflage pattern of the present disclosure to the top of the helmet cover shown in FIG. 25A, the camouflage pattern being shown in color.

FIG. 25A is a top view of the helmet 156. FIG. 25B illustrates the application of the 6-color camouflage pattern 160 of the present disclosure to the top portion of the helmet cover 158.

Figure 26A:
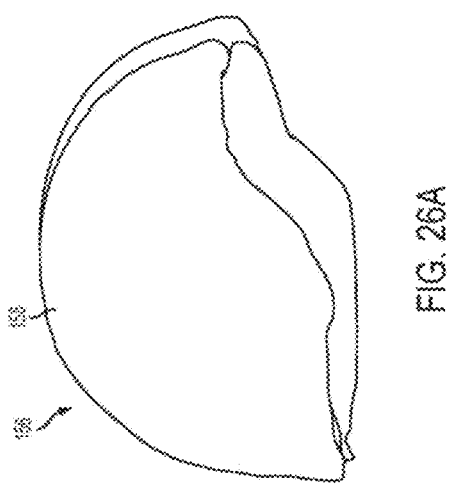
FIG. 26A is a right side view of the helmet and helmet cover illustrated in FIG. 15.
Figure 26B:
FIG. 26B illustrates the application of the 6-color camouflage pattern of the present disclosure to the right side of the helmet cover shown in FIG. 26A, the camouflage pattern being shown in color.

FIG. 26A is a right side view of the helmet 156. FIG. 26B illustrates the application of the 6-color camouflage pattern 160 of the present disclosure to the right side of the helmet cover 158.

Figure 27A:
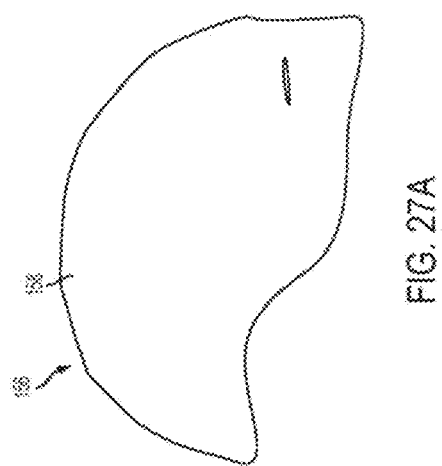
FIG. 27A is a left side view of the helmet and helmet cover illustrated in FIG. 15.
Figure 27B:
FIG. 27B illustrates the application of the 6-color camouflage pattern of the present disclosure to the left side of the helmet cover shown in FIG. 27A, the camouflage pattern being shown in color.

FIG. 27A is a view of the left side of the helmet 156 with the camouflage pattern 160. FIG. 27B illustrates the application of the 6-color camouflage pattern 160 of the present disclosure to the left side of the helmet cover 158.

The camouflage patterns 100 and 160 of the present disclosure can be reproduced on the substrate 140 using any conventional method or process, including for example, dying, rotary screen printing or digital inkjet printing process. Alternatively, sublimation/heat transfer, or iron-on transfer processes can be used. It will be appreciated that several methods can be used to apply or reproduce the color channels 200-800, 260 and camouflage patterns 100, 160 on the substrate 140 according to the present disclosure. Different techniques such as scanning, stencils, templates or photocopying can be used to apply the camouflage pattern 100, 160 on various types of fabric materials and various substrates using dyes or inks.

During a rotary screen printing process for example, the fabric of the substrate 140 may first be dyed to match the lightest color of the pattern. The other colors channels may then printed on top of the dyed substrate. In one embodiment, the rotary screen printing process for the camouflage pattern 100 can include a printing sequence starting with the dark cream channel 300, the tan channel 800, the light sage channel 700, the olive channel 600, the dark green channel 500, the brown channel 200 and the bark brown channel 400. In alternative embodiments, the printing sequence might vary by the particular printer being used. With digital inkjet printing, the complete pattern can be printed onto the fabric line-by-line as the ink head moves across the width of the substrate 140. A similar process applies to the application of the camouflage pattern 160.

The aspects of the present disclosure have no special yardage requirements and can be used in the same manner as other patterns currently fielded by the United States Army. As is generally understood, all patterns have a requirement for manufacturing of one large sized Army Combat Uniform of approximately 6 yards of a minimum of 60 inch wide fabric. Cuts can be made in any area of the cloth so that maximum usage of the cloth is achieved with less waste clippings. The cut and sew process will allow for random depiction of the pattern on different uniforms. This will help with blending of groups of Soldiers so that features of the pattern are not always in the same place on the uniform making it harder to identify the number of soldiers in a group, if detected.

Testing Data

A computer-based camouflage assessment involving a wide range of backgrounds and camouflage patterns was the subject of a test report in July 2014 by the U.S. Army Aberdeen Test Center (ATC). (ATEC Project No.: 2012-DT-ATC-ACU01-F0728; Report No.: ATC-11508). The testing utilized a Pattern-in-Picture (PIP) virtual test process to assess the performance of camouflage patterns in terrains representative of those found within the combatant commands. The objective of this test was to determine whether there was a significant difference in performance between the Operation Enduring Freedom Camouflage Pattern (OEFCP) (the subject of Design Patent D592,861), Scorpion W2, Digital Transition Camouflage (DTC) pattern No. 1 and DTC No. 2 in a photo-simulation blending test. The camouflage pattern identified as Scorpion W2 is the camouflage pattern 100 that is the subject matter of the present patent application.

Seven uniform camouflage patterns were tested. Baseline systems, with performance significantly different than transitional uniforms, were included to provide context for the analysis. The seven patterns tested were: Universal Camouflage Pattern (UCP); OEFCP; Scorpion W2; DTC No. 1; DTC No. 2; Marine Corps Pattern (MARPAT) Woodland and MARPAT Desert.

A photo-simulation of uniform pattern-background composite images was created for presentation to a variety of soldier observers. Images of the seven uniform camouflage patterns under direct natural lighting were collected to paste into background images for the photo simulation test. The background images included woodland verdant, dormant, arid, transitional dormant and transitional verdant.

The uniform pattern-background composite images were organized and shown to soldier-observers using a computer program that simultaneously presents the uniform pattern-background composite images and records the human response data. Observers viewed the uniform pattern-background composite images on the monitor. The uniform pattern-background composite images were rated by the soldier-observers to determine how well the uniform pattern and colors blended with the backgrounds into which they were inserted. The scale of the ratings was from 1 to 100; the higher the number the better the blending to the background. Table 4 below presents the ratings, referred to as Average Blending Scores, where higher blending scores are indicative of better performance. The Scorpion W2 pattern or camouflage pattern 100 generally scored favorably across the five backgrounds presented in Table 4. A review of Table 4 shows that the camouflage pattern 100 of the present disclosure is not significantly different in performance from OEFCP, the '861 patent.

TABLE 4

AVERAGE BLENDING SCORES

| | | AVERAGE BLENDING SCORE | | | | | |
|---|---|---|---|---|---|---|---|
| | | TRANSITIONAL | | WOODLAND | | AVERAGE | |
| PATTERN | ARID | DORMANT | VERDANT | DORMANT | VERDANT | WEIGHTED | STRAIGHT |
| OEFCP | 58 | 54 | 59 | 52 | 65 | 58 | 58 |
| Scorpion W2 | 50 | 51 | 57 | 57 | 64 | 56 | 56 |
| DTC No. 1 | 51 | 53 | 58 | 59 | 61 | 56 | 56 |
| DTC No. 2 | 52 | 54 | 57 | 64 | 61 | 57 | 57 |
| MPW | 30 | 44 | 39 | 82 | 42 | 46 | 48 |
| MPD | 61 | 48 | 34 | 21 | 33 | 40 | 39 |
| UCP | 25 | 16 | 13 | 9 | 17 | 16 | 16 |
| Weights | 0.19 | 0.24 | 0.20 | 0.15 | 0.22 | | |

The aspects of the disclosed embodiments provide a camouflage pattern that, when applied to a substrate, is configured to provide improved concealment in both the visible, near-infrared (NIR) and shortwave infrared (SWIR) range of the electromagnetic spectrum. Through the use of gradients in both fill and warp directions, combined with larger blotches of colors, a well-performing camouflage pattern is achieved that will allow a soldier wearing a uniform bearing the camouflage pattern to blend into various transitional environments.

The use of gradients that intersect with solid colors that overlap each other in the pattern gives the appearance of having many different blends and depths of color without creating a cluttered pattern that is distracting to the eye. This improves the effective range of a substrate, such as a uniform, with the camouflage pattern 100 applied thereto, meaning that an observer will perceive more break-up of the camouflage pattern 100 over longer distances.

The use of thin vertically oriented line elements in the warp direction of a pattern repeat is eliminated in the camouflage pattern 100 of the disclosed embodiments. This improves the performance of the camouflage pattern 100 across a wide range of terrains. As noted, the thin vertically oriented line elements disposed in the warp direction that are used in some existing camouflage patterns will have a tendency to be perceived as merging together over shorter distances. Additionally, some transitional environments may not include vertical terrain elements. The inclusion of vertically oriented thin line elements disposed in the warp direction of a camouflage pattern might compromise the effectiveness of the pattern due to the signature cues in the warp or vertical direction.

The optimization of the dyestuffs through layering and the inclusion of gradients, provides improved performance of the camouflage pattern in visual, near-infrared and shortwave infrared spectrums. By increasing the amount of brown appearing in the pattern 100, the selection of dyes and pigments available to achieve appropriate near NIR and SWIR performance in the overall pattern is improved. Strategic layering of the colors, or color channels, maximizes the NIR and SWIR effectiveness through the combination of dyestuffs to create "blended" colors and optimizes the effectiveness/robustness of dyes to achieve optimum NIR and SWIR characteristics/properties.

Every color channel or screen is used to print its own respective dye on the camouflage pattern with its own spectral reflectance characteristics. The dyes combine in the printing process such that if one dye is laid on top of another, that base layer's reflectance characteristics will impact those of the dye above it, resulting in a unique spectral response to a sensor at that location in the pattern. Where the camouflage pattern 100 of the disclosed embodiments is made up of many instances of different amounts of the colors being combined with each other, it results in a pattern with complex breakup characteristics that performs well without appearing cluttered.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those blotches and/or method steps, which perform substantially the same function in substantially the same way to achieve the same results, are within the scope of the invention. Moreover, it should be recognized that structures and/or blotches and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A camouflage pattern on a substrate, comprising:
a substrate having a camouflage pattern with a set of intermixed colored blotches thereon, the colors of the set of intermixed colored blotches being selected from a group of six colors comprising an Olive 527 color, a Dark Green 528 color, a Tan 525 color, a Brown 529 color, a Bark Brown 561 color and a Dark Cream 559 color, wherein in a single repeat of the camouflage pattern about 6.9% to and including 8.1% of the colors in the set of intermixed colored blotches consist of the Bark Brown 561 color and a color layer in the set of intermixed colored blotches that are colored in the Brown 529 color has a first gradient that extends vertically across a width of a repeat of the camouflage pattern.

2. The camouflage pattern on the substrate of claim 1, wherein a color layer in the set of intermixed colored blotches that are colored in the Dark Green 528 color has a second gradient that extends horizontally along a length of the repeat of the camouflage pattern.

3. A camouflage pattern on a substrate, comprising:
a substrate having a camouflage pattern with a set of intermixed colored blotches thereon, colors of the set of intermixed colored blotches being selected from a group of seven colors comprising an Olive 527 color, a Dark Green 528 color, a Light Sage 560 color, a Tan 525 color, a Brown 529 color, a Bark Brown 561 color and a Dark Cream 559 color, wherein in a single repeat of the camouflage pattern about 6.9% to and including 8.1% of the colors in the set of intermixed colored blotches consist of the Bark Brown 561 color and a color layer in the set of intermixed colored blotches that are colored in the Brown 529 color has a first gradient that extends vertically across a width of a repeat of the camouflage pattern.

4. The camouflage pattern on the substrate of claim 3, wherein a color layer in the set of intermixed colored blotches that are colored in the Dark Green 528 color has a second gradient that extends horizontally along a length of the repeat of the camouflage pattern.

5. A camouflage pattern on a fabric, comprising:
a fabric having a camouflage pattern with a set of intermixed colored blotches thereon, the colors of the set of intermixed colored blotches being selected from a group of colors comprising an Olive 527 color, a Dark Green 528 color, a Tan 525 color, a Brown 529 color, a Bark Brown 561 color and a Dark Cream 559 color, wherein in a single repeat of the camouflage pattern about 6.9% to and including 8.1% of the colors in the set of intermixed colored blotches consist of the Bark Brown 561 color and a color layer in the set of intermixed colored blotches that are colored in the Brown 529 color has a first gradient that extends vertically across a width of a repeat of the camouflage pattern.

6. The camouflage pattern on the fabric of claim 5, wherein a color layer in the set of intermixed colored blotches that are colored in the Dark Green 528 color has a second gradient that extends horizontally along a length of the repeat of the camouflage pattern.

7. A camouflage pattern on a fabric, comprising:
a fabric having a camouflage pattern with a set of intermixed colored blotches thereon, the colors of the set of intermixed colored blotches being selected from a group of colors comprising an Olive 527 color, a Dark Green 528 color, a Light Sage 560 color, a Tan 525 color, a Brown 529 color, a Bark Brown 561 color and a Dark Cream 559 color, wherein in a single repeat of the camouflage pattern about 6.9% to and including 8.1% of the colors in the set of intermixed colored blotches consist of the Bark Brown 561 color and a color layer in the set of intermixed colored blotches that are colored in the Brown 529 color has a first gradient that extends vertically across a width of a repeat of the camouflage pattern.

8. The camouflage pattern on the fabric of claim 7, wherein a color layer in the set of intermixed colored blotches that are colored in the Dark Green 528 color has a second gradient that extends horizontally along a length of the repeat of the camouflage pattern.

9. The camouflage pattern on the substrate of claim 1, wherein blotches of the set of intermixed colored blotches are horizontally oriented in a fill direction of the repeat of the camouflage pattern.

10. The camouflage pattern on the substrate of claim 1, wherein the first gradient comprises a lighter region followed by a darker region followed by a lighter region.

11. The camouflage pattern on the substrate of claim 1, wherein an intensity of the first gradient increases in a vertical direction along the repeat of the camouflage pattern.

12. The camouflage pattern on the substrate of claim 3, wherein blotches of the set of intermixed colored blotches are horizontally oriented in a fill direction of the repeat of the camouflage pattern.

13. The camouflage pattern on the substrate of claim 3, wherein the first gradient comprises a lighter region followed by a darker region followed by a lighter region.

14. The camouflage pattern on the substrate of claim 3, wherein an intensity of the first gradient increases in a vertical direction of the repeat of the camouflage pattern.

15. The camouflage pattern on the fabric of claim 5, wherein blotches of the set of intermixed colored blotches are horizontally oriented in a fill direction of the repeat of the camouflage pattern.

16. The camouflage pattern on the fabric of claim 5, wherein the first gradient comprises a lighter region followed by a darker region followed by a lighter region.

17. The camouflage pattern on the fabric of claim 5, wherein an intensity of the first gradient increases in a vertical direction of the repeat of the camouflage pattern.

18. The camouflage pattern on the fabric of claim 7, wherein blotches of the set of intermixed colored blotches are horizontally oriented in a fill direction of the repeat of the repeating camouflage pattern.

19. The camouflage pattern on the fabric of claim 7, wherein the first gradient comprises a lighter region followed by a darker region followed by a lighter region.

20. The camouflage pattern on the fabric of claim 7, wherein an intensity of the first gradient increases in a vertical direction along the repeat of the repeating camouflage pattern.

\* \* \* \* \*